United States Patent
Morita et al.

(10) Patent No.: US 11,664,746 B2
(45) Date of Patent: May 30, 2023

(54) FRICTION MEMBER TO CONTACT OPPOSITE MEMBER, METHOD FOR MANUFACTURING FRICTION MEMBER, VIBRATION-TYPE ACTUATOR, AND ELECTRONIC DEVICE

(71) Applicant: CANON KABUSHIKI KAISHA, Tokyo (JP)

(72) Inventors: Hiromitsu Morita, Ageo (JP); Jun Tamai, Yokohama (JP); Yasuyuki Araki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 370 days.

(21) Appl. No.: 16/685,369

(22) Filed: Nov. 15, 2019

(65) Prior Publication Data

US 2020/0083822 A1    Mar. 12, 2020

Related U.S. Application Data

(62) Division of application No. 15/612,095, filed on Jun. 2, 2017, now Pat. No. 10,530,277.

(30) Foreign Application Priority Data

Jun. 10, 2016  (JP) ................................. 2016-116120
Jun. 10, 2016  (JP) ................................. 2016-116121
May 22, 2017  (JP) ................................. 2017-100882

(51) Int. Cl.
*H02N 2/00*   (2006.01)
*F16F 7/04*   (2006.01)
(Continued)

(52) U.S. Cl.
CPC ............... *H02N 2/007* (2013.01); *F16F 7/04* (2013.01); *H02N 2/22* (2013.01); *H02N 2/026* (2013.01); *H02N 2/103* (2013.01); *H02N 2/163* (2013.01)

(58) Field of Classification Search
CPC .......... H02N 2/007; H02N 2/22; H02N 2/026; H02N 2/103; H02N 2/163; H02N 2/0015;
(Continued)

(56) References Cited

U.S. PATENT DOCUMENTS 4,532,019 A * 7/1985 Kuromatsu .............. B24D 5/06
                                                      204/290.01
5,047,806 A   9/1991 Brewington et al.
(Continued)

FOREIGN PATENT DOCUMENTS

CN    1273426 A * 11/2000 ........... C23C 24/045
CN   102403924 A    4/2012
(Continued)

OTHER PUBLICATIONS

Machine translation of JP H06-68332 B2, pp. 1-20, Jun. 1994 (Year: 1994).*

(Continued)

*Primary Examiner* — Emily P Pham
(74) *Attorney, Agent, or Firm* — Venable LLP

(57) ABSTRACT

A vibration-type actuator capable of suppressing reduction in holding torque or holding force under influence of humidity. A vibration-type actuator 10 includes a vibrating body 2 and a driven body 1. The vibrating body 2 has a piezoelectric element 2c and an elastic body 2b. The driven body 1 is in contact with the vibrating body 2. The vibration-type actuator 10 moves the vibrating body 2 and the driven body 1 relatively to each other by vibration excited to the vibrating body 2. At least one of a first contact portion of the vibrating (Continued)

body 2 and a second contact portion of the driven body 1 includes a stainless-steel sintered body with pores and at least some of the pores are impregnated with a resin.

7 Claims, 19 Drawing Sheets

(51) Int. Cl.
*H02N 2/02* (2006.01)
*H02N 2/10* (2006.01)
*H02N 2/16* (2006.01)

(58) Field of Classification Search
CPC .......... H02N 2/106; H02N 2/001; F16F 7/04; H01L 41/0475
See application file for complete search history.

(56) References Cited

U.S. PATENT DOCUMENTS

| | | | |
|---|---|---|---|
| 5,122,700 A | 6/1992 | Tamai et al. | |
| 5,688,728 A * | 11/1997 | Niwa | C04B 38/08 501/105 |
| 5,760,529 A | 6/1998 | Tamai et al. | |
| 6,107,724 A | 8/2000 | Tamai et al. | |
| 6,107,725 A | 8/2000 | Tamai | |
| 6,140,741 A | 10/2000 | Tamai et al. | |
| 6,150,749 A | 11/2000 | Tamai et al. | |
| 6,720,707 B2 | 4/2004 | Tamai et al. | |
| 8,525,388 B2 | 9/2013 | Araki | |
| 10,442,739 B2 * | 10/2019 | Kobayashi | F02F 1/4264 |
| 10,530,277 B2 * | 1/2020 | Morita | H02N 2/007 |
| 2002/0016242 A1 * | 2/2002 | Nozawa | B65H 29/12 492/30 |
| 2009/0073596 A1 * | 3/2009 | Asada | F16C 33/107 360/55 |
| 2009/0233237 A1 * | 9/2009 | Yoshiki | H05K 3/106 430/311 |
| 2012/0325031 A1 | 12/2012 | Sumitomo | |
| 2013/0334932 A1 * | 12/2013 | Maruyama | H01L 41/0815 310/348 |
| 2014/0319684 A1 * | 10/2014 | Suzuki | H01L 23/66 257/746 |
| 2016/0258383 A1 * | 9/2016 | Kobayashi | F02F 1/24 |
| 2017/0359002 A1 * | 12/2017 | Morita | H02N 2/22 |
| 2019/0013745 A1 | 1/2019 | Araki | |

FOREIGN PATENT DOCUMENTS

| | | | |
|---|---|---|---|
| CN | 105207519 A | 12/2015 | |
| EP | 2 677 067 A1 | 12/2013 | |
| JP | 3-273877 A | 12/1991 | |
| JP | 5-141427 A | 6/1993 | |
| JP | 0668332 B2 * | 6/1994 | ............ F16K 11/06 |
| JP | 10-178789 A | 6/1998 | |
| JP | 11-136973 A | 5/1999 | |
| JP | 2000175466 A * | 6/2000 | ........... C23C 24/045 |
| JP | 2003-47262 A | 2/2003 | |
| JP | 2008-160989 A | 7/2008 | |
| JP | 5236160 B2 | 7/2013 | |

OTHER PUBLICATIONS

Extended European Search Report in European Application No. 17175180.3 (dated Oct. 23, 2017).
Communication Pursuant to Article 94(3) EPC in European Application No. 17175180.3 (dated Nov. 8, 2018).
First Office Action in Chinese Application No. 201710429626.8 (dated Mar. 6, 2019).

* cited by examiner

FRICTION MEMBER TO CONTACT OPPOSITE MEMBER, METHOD FOR MANUFACTURING FRICTION MEMBER, VIBRATION-TYPE ACTUATOR, AND ELECTRONIC DEVICE

CROSS REFERENCE TO RELATED APPLICATIONS

This application is a divisional application of U.S. patent application Ser. No. 15/612,095, filed Jun. 2, 2017, which claims the benefit of Japanese Patent Application No. 2016-116121, filed Jun. 10, 2016, Japanese Patent Application No. 2016-116120, filed Jun. 10, 2016, and Japanese Patent Application No. 2017-100882, filed May 22, 2017. Each of these prior applications is hereby incorporated herein by reference wherein in its entirety.

BACKGROUND OF THE INVENTION

Field of the Invention

The present invention relates to a friction member to contact an opposite member, a method for manufacturing the friction member, a vibration-type actuator and an electronic device using the friction member.

Description of the Related Art

There is known a vibration-type actuator that brings a vibrating body including an electric-mechanical energy conversion element and a driven body into pressure contact with each other, and excites predetermined vibration to the vibrating body and imparts frictional driving force from the vibrating body to the driven body, thereby to move relatively the vibrating body and the driven body. For example, a rotation-driven vibration-type actuator has high holding torque (a linear-driven vibration-type actuator has high holding force) and thus can maintain the positional relationship between the vibrating body and the driven body in a non-energized state even in the presence of external force. That is, immediately after driving of the vibration-type actuator, holding torque or holding force equivalent to the maximum torque generated at the time of driving can be obtained.

However, the vibration-type actuator has a problem that, when being left in a high-humidity environment, water is absorbed on a friction surface (frictional sliding surface) to reduce the holding torque or holding force at the time of the subsequent activation. Japanese Patent No. 5236160 describes a technique as a solution to this problem by which the surface layer of a stainless-steel friction member with a titanium carbon sulfide phase dispersed is subjected to nitriding treatment. Specifically, the stainless-steel material with a titanium carbon sulfide phase dispersed is subjected to nitriding treatment such as ion nitriding to turn the titanium carbon sulfide phase on the surface layer into a titanium nitride phase and the like, thereby generating a hardened layer with the titanium nitride phase and the like dispersed. The titanium nitride phase and the like are hard and unlikely to be worn, and fine convex portions are formed on a friction surface through the frictional wear. Even though water is absorbed on the friction surface, the convex portions break a water film to secure a real contact portion. This makes it possible to suppress reduction in the holding toque or holding force after the actuator is left in a high-humidity environment.

However, according to the technique described in Japanese Patent No. 5236160, hard particles in the titanium nitride phase and the like bite into an opposite member to cause abrasive wear with generation of frictional driving force. Accordingly, attempting to obtain high holding torque or holding force leads to a problem of increase in the wear amount of the opposite member.

In addition, the friction member for use in the vibration-type actuator needs various characteristics other than the friction characteristics against humidity. For example, the friction member is required to have abrasion resistance according to the use application of the vibration-type actuator, the degree of change in the frictional force with advancement of abrasion, the ability to obtain constant frictional force regardless of the relative positions of the driven body and the vibrating body, the spread of less abrasion powder, and the like. According to the technique described in Japanese Patent No. 5236160, the particle size, quantity, shape, dispersion state, and the like of the titanium nitride and the like depend on the titanium carbonate sulfide crystallized in a steel member before the nitriding treatment. Therefore, it is not easy to design and control freely the state and characteristics of the friction surface in manufacturing the friction member for vibration-type actuator by the nitriding treatment.

Further, the friction member is desirably provided only in a necessary area of the vibrating body for use in the vibration-type actuator in order to not only secure the friction characteristics but also reduce the occurrence of vibration damping due to the friction member. In correspondence to this, using a bonding method such as adhesion, welding, or brazing may lead to defective bonding or uneven bonding, thereby making the vibration characteristics unstable.

SUMMARY OF THE INVENTION

The present invention provides a vibration-type actuator that can suppress the abrasion of an opposite member, suppress reduction in holding torque or holding force under the influence of humidity, and has no impairment of the characteristics depending on the use application.

Accordingly, the present invention provides a vibration-type actuator, comprising a vibrating body comprising an electric-mechanical energy conversion element and an elastic body, and a driven body configured to be in contact with the vibrating body. The vibration-type actuator moves the vibrating body and the driven body relatively to each other by vibration excited to the vibrating body, and at least one of a first contact portion of the vibrating body to be in contact with the driven body and a second contact portion of the driven body to be in contact with the vibrating body includes a stainless-steel sintered body with pores and at least some of the pores are impregnated with a resin.

According to the present invention, it is possible to provide a vibration-type actuator that can suppress the abrasion of an opposite member, suppress reduction in holding torque or holding force under the influence of humidity, and has no impairment of the characteristics depending on the use application.

Further features of the present invention will become apparent from the following description of exemplary embodiments (with reference to the attached drawings).

DESCRIPTION OF THE EMBODIMENTS

Figure 1A:
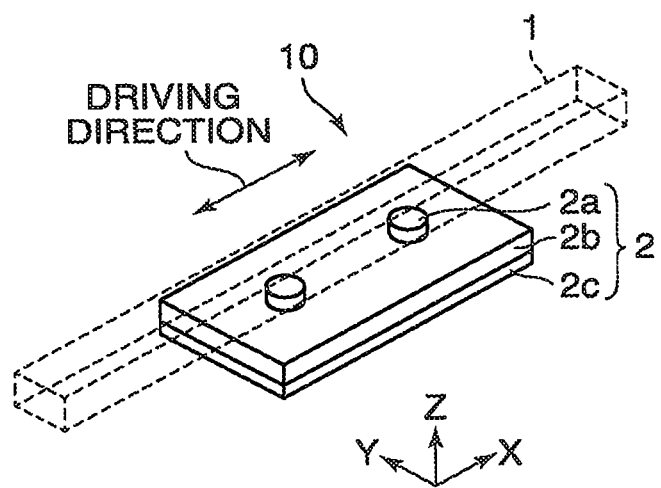
FIGS. 1A to 1D are diagrams schematically showing configuration of a first vibration-type actuator.
Figure 1B:
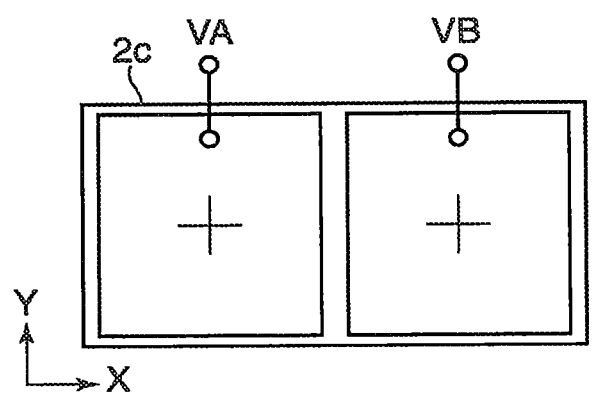
Figure 1C:
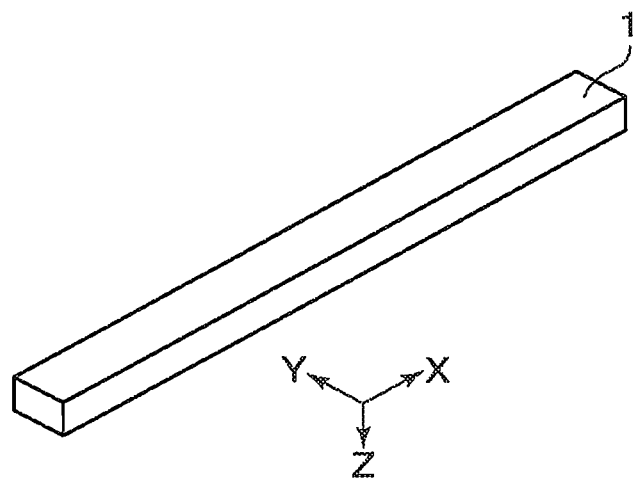

The present invention will now be described in detail with reference to the drawings showing an embodiment thereof. First, a configuration example of a first vibration-type actuator according to the present invention will be described. FIGS. 1A to 1C are diagrams schematically showing configuration of a first vibration-type actuator 10. FIG. 1A is a schematic perspective view of the configuration of the vibration-type actuator 10. The vibration-type actuator 10 includes a driven body 1 and a vibrating body 2. The vibrating body 2 has an almost rectangular plate-like elastic body 2b as a base member, an almost plate-like piezoelectric element 2c that is bonded to one surface of the elastic body 2b by an adhesive or the like, and two projections 2a that are provided on the surface of the elastic body 2b opposite to the surface to which the piezoelectric element 2c is bonded.

For the sake of description, an X axis, a Y axis, and a Z axis orthogonal to one another are defined as shown in FIG. 1A. The direction of the X axis is the direction in which the two projections 2a are linked and the direction of relative movement of the driven body 1 and the vibrating body 2 as described later. The direction of the Z axis is the direction of thickness of the elastic body 2b and the direction in which the projections 2a project. The direction of the Y axis is the direction orthogonal to both the X axis and the Z axis and the direction of width of the elastic body 2b. The driven body 1 is in pressure contact with the two projections 2a in the direction of the Z axis by a pressurizing unit not shown. Hereinafter, a portion of the vibrating body 2 contacting the driven body 1 is defined as a "first contact portion" and a portion of the driven body 1 contacting the first contact portion of the vibrating body 2 is defined as a "second contact portion". In the vibration-type actuator 10, for example, the tips of the projections 2a are brought into elliptic motion in a plane including the direction of the X axis and the direction of the Z axis (ZX plane) so as to move the driven body 1 and the vibrating body 2 relative to each other in the direction of the X axis.

FIG. 1B is a planar view of an electrode structure of the piezoelectric element 2c. As an example of electric-mechanical energy conversion element, the piezoelectric element 2c has electrode regions bisected in the direction of the X axis, and the electrode regions are the same in the direction of polarization (+). For example, alternating voltages VA and VB of frequencies close to resonance frequencies in a primary out-of-plane bending vibration mode and a secondary out-of-plane bending vibration mode are applied to the two electrodes in the piezoelectric element 2c as shown in FIG. 1B. Accordingly, the vibration in the primary out-of-plane bending vibration mode and the vibration in the secondary out-of-plane bending vibration mode are combined together to cause elliptic motion to the projections 2a in the ZX plane. The elliptic motion allows the driven body 1 and the vibrating body 2 to move relative to each other in the direction of the X axis.

It should be noted that the primary out-of-plane bending vibration mode is the mode of bending vibration in the direction of the Y axis in which two nodal lines appear on the vibrating body 2 in almost parallel to the direction of the X axis. The secondary out-of-plane bending vibration mode is the mode of bending vibration in the direction of the X axis in which three nodal lines appear on the vibrating body 2 in almost parallel to the direction of the Y axis. The two projections 2a are positioned in the antinode of vibration in the primary out-of-plane bending vibration mode and in the antinode of vibration in the secondary out-of-plane bending vibration mode. The principle behind which the projections 2a of the vibrating body 2 are brought into elliptic motion in the ZX plane is well known and detailed descriptions thereof are omitted.

FIG. 1C is a schematic perspective view of the driven body 1. The square bar-shaped driven body 1 is formed from a stainless-steel sintered body obtained by sintering stainless-steel powder with constant porosity, and one XY plane of the driven body 1 constitutes a second friction portion (friction surface, frictional sliding surface) to be in pressure contact with the projections 2a. The driven body 1 is manufactured, for example, by shaping stainless-steel powder into a square bar body by a known shaping method, then sintering the shaped body in a non-oxidizing atmosphere such as a vacuum atmosphere, and then polishing (grinding)

at least the friction surface of the obtained sintered body. The stainless-steel powder may be, for example, SUS420j2 powder (with an average particle diameter of about 10 μm, for example) under JIS standards. As sintering conditions in this case, the powder may be sintered in the vacuum atmosphere for 30 minutes at 1100° C. and then rapidly cooled. To manufacture a SUS420j2 sintered body, the sintered body can be hardened by quenching treatment through rapid cooling from the sintering temperature. This makes it possible to enhance the abrasion resistance of the driven body 1 made of the SUS420j2 sintered body and improve the durability of the vibration-type actuator 10. To obtain this effect, the Vickers hardness of the SUS420j2 sintered body is desirably 600 HV or more.

The stainless-steel sintered body as the driven body 1 has a certain number of pores. Therefore, even though the vibration-type actuator 10 is left in a high-humidity environment where water (water molecules) attaches to the second friction portion (friction surface) of the driven body 1, the pores act as water absorbing places to facilitate securing the real contact portions between the projections 2a and the driven body 1. This suppresses reduction in the holding force of the vibration-type actuator 10. In addition, the driven body 1 does not advance the abrasion of the projections 2a as the opposite members, unlike a friction member whose hard particles bite into the opposite members to generate frictional driving force as described above in the column of the related art. Suppressing effect of reduction in the holding torque or holding force has been recognized in a case where an average ratio of the pores in a certain area of the friction surface of the stainless-steel sintered body contacting the projections 2a (hereinafter, called "surface porosity ratio") is about 5 to 40%. In particular, the average surface porosity ratio is desirably set to around 10% from the viewpoints of enhancing abrasion resistance. The surface porosity ratio can be measured by capturing an image of the surface of the friction surface under a microscope into an image processing software application. It should be noted that, since the friction surface of the stainless-steel sintered body wears gradually, the surface porosity ratio hardly changes with a slight abrasion but is desirably to be kept within a range described above even after abrasion.

The foregoing effect is not limited to the case where the driven body 1 is made from a SUS420j2 sintered body but can also be obtained in the case where the driven body 1 is made from another stainless-steel sintered body. It should be noted that, since the pores in the driven body 1 absorb (attract) abrasion powder, it is possible to suppress accumulation of the abrasion powder on the friction surface to prevent changes in the driving performance, and avoid the problem of a deteriorated appearance due to the scattered abrasion powder. Suppressing the scattering of the abrasion powder to the outside makes it possible to reduce the influence of the abrasion powder on various devices such as electronic devices equipped with the vibration-type actuator 10.

Figure 1D:
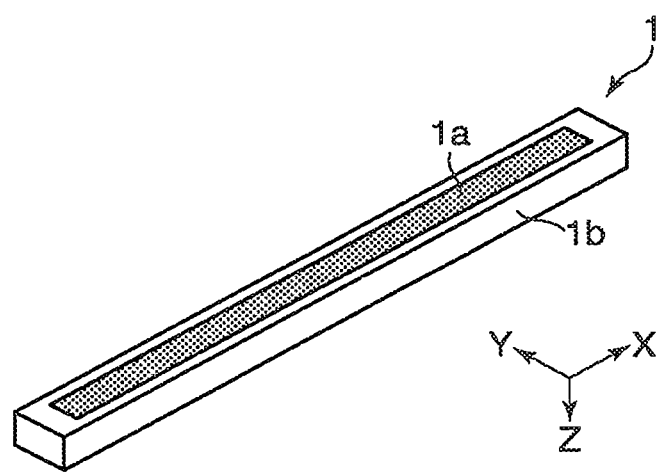

FIG. 1D is a schematic perspective view of a variation of the driven body 1. The variation of the driven body 1 has a main body portion 1b as a base member and a friction portion 1a provided on the main body portion 1b. The friction portion 1a is a second contact portion contacting the projections 2 of the vibrating body 2 and is a portion that slides frictionally on the projections 2a of the vibrating body 2 during driving of the vibration-type actuator 10. The friction portion 1a is made from a stainless-steel sintered body with pores (vacancies). These pores absorb water to help securing the real contact portions between the projections 2a and the friction portion 1a. This suppresses reduction in the holding force of the vibration-type actuator 10. In addition, since the pores in the friction portion 1a absorb (attract) abrasion powder, it is possible to suppress accumulation of the abrasion powder on the friction surface (frictional sliding surface) to prevent changes in the driving performance. Further, suppressing the scattering of the abrasion powder to the outside makes it possible to suppress the influence of the abrasion powder on various devices such as electronic devices equipped with a vibration-type actuator. Moreover, the friction portion 1a does not advance the abrasion of the projections 2a as the opposite members, unlike a friction member whose hard particles bite into the opposite members to generate frictional driving force as described above in the column of the related art.

A method for forming the friction portion 1a in the main body portion 1b will be described. First, slurry (paste) with stainless-steel powder dispersed is applied to one surface of the main body portion 1b made from a square bar-shaped stainless-steel material by a screen printing method or the like to shape a body of the stainless-steel powder on the main body portion 1b. Then, the slurry-applied portion (shaped body of the stainless-steel powder) and the main body portion 1b are integrally heated and burned at a predetermined temperature to sinter the shaped body of stainless-steel powder. Accordingly, the driven body 1 in which the friction portion 1a as the stainless-steel sintered body and the main body portion 1b as the square bar body are directly bonded to each other by integral sintering can be obtained. It should be noted that the direct bonding of the friction portion 1a and the main body portion 1b means that they are bonded without any other material such as an adhesive or a brazing material.

The main body portion 1b can be made from a stainless-steel material such as SUS304, and the stainless-steel powder as a raw material for the friction portion 1a can be made from SUS420j2 powder with an average particle diameter of about 10 μm. The sintering conditions in this case are the same as the sintering conditions for the driven body 1 described above.

Figure 2A:
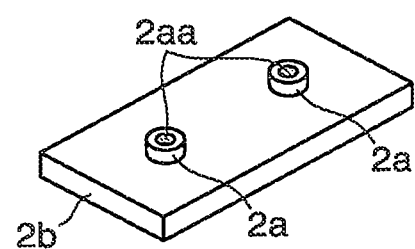
FIGS. 2A and 2B are diagrams schematically showing projections having a contact portion (friction portion) containing a stainless-steel sintered body.
Figure 2B:
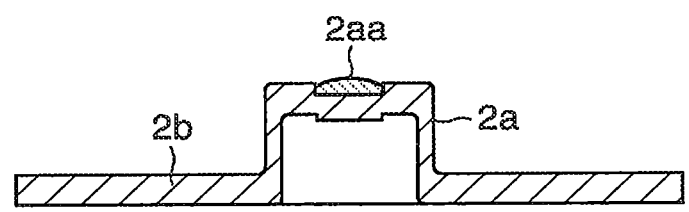

In addition to or instead of using a stainless-steel sintered body for the driven body 1 and the friction portion 1a, a stainless-steel sintered body may be provided on the first contact portion of the projections 2a. FIGS. 2A and 2B are diagrams schematically showing the projections 2a having friction portions 2aa (first contact portion) made from a stainless-steel sintered body. FIG. 2A is a schematic perspective view of the projections 2a having the friction portions 2aa, and FIG. 2B is a schematic cross-sectional view of the projection 2a having the friction portion 2aa. The elastic body 2b can be a member that is formed, for example, by pressing a stainless-steel plate material such as SUS420j2 to form the projections 2a integrally in the elastic body 2b and form concaves in the centers of the tips of the projections 2a. The friction portions 2aa having composition (microstructure) equivalent to that of the friction portion 1a are provided in the concaves of the projections 2a. The friction portions 2aa are formed by sintering integrally with the elastic body 2b, for example. The surfaces of the friction portions 2aa are formed in an almost spherical shape to define the positions of contact with the driven body 1 and enable to maintain the surfaces of the friction portions 2aa in a round shape irrespective of abrasion. As a result, the performance of the vibration-type actuator 10 can be made stable.

Figure 3A:
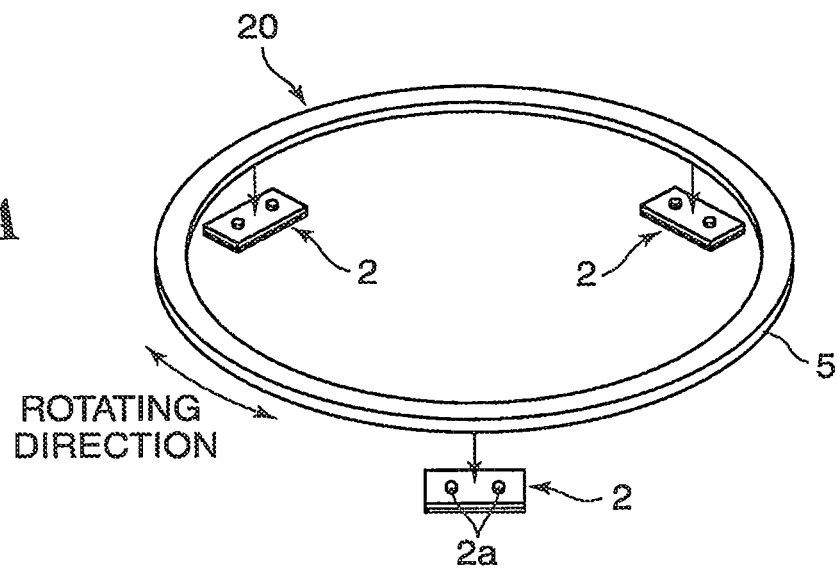
FIGS. 3A to 3C are diagrams schematically showing configuration of a second vibration-type actuator.
Figure 3B:
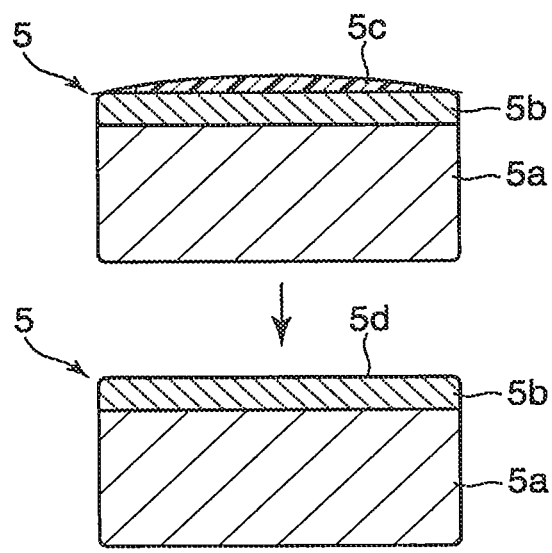
Figure 3C:
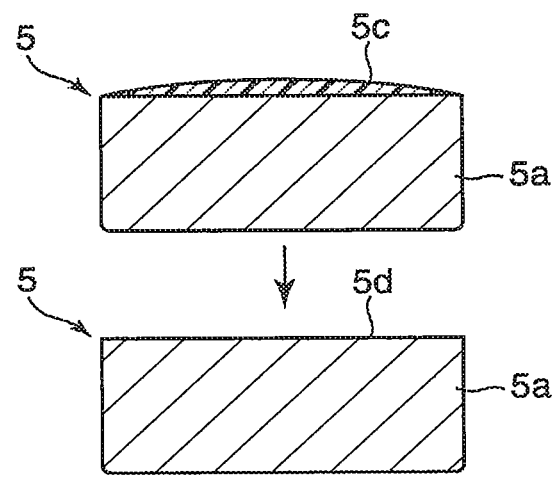

Next, a configuration of a second vibration-type actuator using the friction member according to the embodiment of the present invention will be explained. FIGS. 3A to 3C are diagrams schematically showing configuration of a second vibration-type actuator 20. FIG. 3A is an exploded perspective view of the vibration-type actuator 20. The vibration-type actuator 20 includes a ring-shaped driven body 5 and three vibrating bodies 2. The three vibrating bodies 2 are disposed on a base stage not shown such that the direction of linking two projections 2a are aligned to the direction of a tangent line to a circle concentric with the inner circumference or the outer circumference of the driven body 5, thereby rotating the driven body 5 in the circumferential direction. It should be noted that the tips of the projections 2a of the vibrating bodies 2 and one surface of the driven body 5 (friction surface 5d (see FIG. 3B)) almost parallel to the radial direction thereof are brought into pressure contact with each other by a pressurizing unit not shown. Disposing the three vibrating bodies 2 under the same specifications and changing the sizes (shapes) of the base stage on which the three vibrating bodies 2 are placed and the driven body 5 makes it possible to manufacture vibration-type actuators with various outer diameters and inner diameters.

The driven body 5 is made from a sintered body of SUS316 powder as a kind of austenite stainless steel, for example. The friction surface 5d of the second contact portion which contacts the vibrating body 2 has a nitride layer impregnated with a resin. FIG. 3B is a diagram schematically showing a process for manufacturing the driven body 5. SUS316 powder is shaped into an annular body using a known shaping method and is sintered under predetermined conditions to produce a sintered body 5a with an average particle diameter of about 75 μm, for example. The sintered body 5a is cut and reshaped, and then one surface of the sintered body 5a almost parallel to the radial direction of the sintered body 5a is subjected to hardening treatment to enhance abrasion resistance. Specifically, a nitride layer 5b is provided on the one surface of the sintered body 5a by an ion nitriding method. Further, a liquid epoxy resin 5c is applied to the one surface of the nitride layer 5b, and the sintered body 5a is held at 50° C. to decrease the viscosity of the epoxy resin and then impregnate the pores in the nitride layer 5b with the epoxy resin. This impregnating treatment may be carried out in a vacuum atmosphere to facilitate the impregnation of the pore with the epoxy resin 5c. After that, the epoxy resin 5c is hardened by holding the sintered body 5a at 80° C. for one hour, for example. Subsequently, the resin hardened portion on the nitride layer 5b is removed by using GC #320 emery paper, for example, and the sintered body 5a is polished (lapped) by using a copper surface plate and polycrystalline diamond (with an average particle diameter of 3 μm) to form a smoothed friction surface 5d. Accordingly, the driven body 5 can be obtained.

It should be noted that, in the vibration-type actuator 20, the limited numbers of the pores, not all, in the driven body 5 are desirably impregnated with the resin so as to accumulate abrasion powder in pores not impregnated with the resin. The impregnation of the driven body 5 with the resin is also applicable to the driven body 1 described above with reference to FIG. 1. In addition, ceramic powder such as green carborundum (GC) or white alundum (WA) ceramic powder may be mixed into the liquid epoxy resin depending on the required characteristics of the driven body 5. The kind, particle diameter, particle shape, quantity, and the like of the added ceramic powder can be adjusted as appropriate depending on the required characteristics of the driven body 5, taking into account the porosity, pore diameter, and the like of the sintered body 5a. Instead of the epoxy resin, an acrylic resin may be used in the impregnating treatment.

The stainless-steel material for use in the driven body 5 is not limited to an austenite stainless steel but may be a ring-shaped sintered body of martensite stainless steel such as SUS420j2. In the case of using a sintered body of SUS420j2 powder for the driven body 5, the sintered body can be rapidly cooled after being held at a sintering temperature for a predetermined period of time so as to perform quenching treatment for enhancing the hardness, thereby achieving improvement in abrasion resistance (durability). However, in the view of an object of the present invention to suppress reduction in the holding toque or holding force under the influence of humidity, it is not essential that the friction surface 5d of the driven body 5 is hardened or the nitride layer 5b is impregnated with the resin. FIG. 3C is a diagram schematically showing a process for manufacturing the driven body 5 without a nitride layer. In the case of using a sintered body of SUS420j2 powder for the driven body 5, the sintered body can be increased in hardness by quenching, which makes a nitride layer unessential. Meanwhile, to obtain the characteristic of enhancement in abrasion resistance (improvement in durability), the friction surface 5d is desirably subjected to hardening treatment and impregnating treatment with the resin.

Figure 3D:
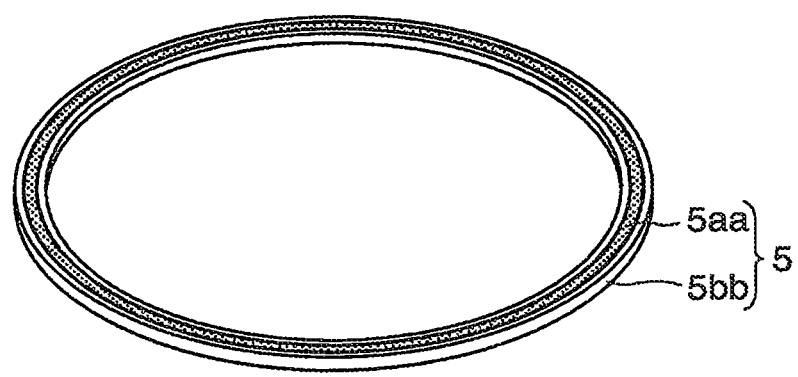
FIGS. 3D and 3E are diagrams schematically showing configuration of a variation of the second vibration-type actuator.
Figure 3E:
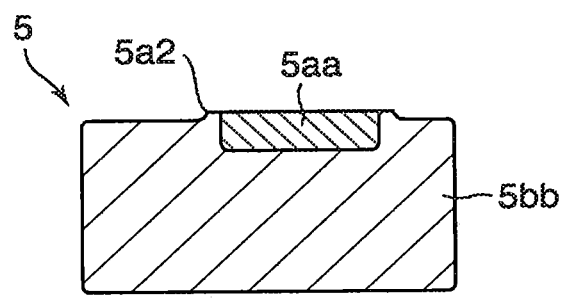

FIGS. 3D and 3E are diagrams schematically showing configuration of a variation of the second vibration-type actuator.

FIG. 3D is a perspective view of the driven body 5 in the variation of the second vibration-type actuator. FIG. 3E is a cross-sectional view of the driven body 5 including a thrust shaft, showing only one of two cross sections of the driven body 5. The driven body 5 has a friction portion 5aa as a second contact portion and a main body portion 5bb as a base member. The friction portion 5aa is brought into pressure contact with the projections 2a of the vibrating body 2 and receives frictional driving force from elliptic motion excited by the projections 2a during driving of the vibration-type actuator. The friction portion 5aa is embedded in an annular concave (groove) formed in the main body portion 5bb.

A first method for manufacturing the driven body 5 will be explained. First, the main body portion 5bb is prepared from SUS316 with a convex 5b2 formed on one surface thereof and a concave 5b1 formed in the convex 5b2. It should be noted that the method for manufacturing the main body portion 5bb is not limited to this. Specifically, 2 weight % of copper powder (with an average particle diameter of 10 μm) is mixed into SUS316 powder (water atomized powder with an average particle diameter of 10 μm) to prepare a mixture of powder. Then, the mixture of powder is accumulated into the concave 5b1 and is shaped with application of a pressure of about 50 MPa (1.5 tons/300 mm²) by a tubular punch (pressurizing member) for a predetermined period of time. After that, the shaped body is held integrally with the main body portion 5bb in a vacuum atmosphere at 1100° C. for one hour and is rapidly cooled by a nitrogen gas. Accordingly, a stainless-steel sintered body firmly bonded to the main body portion 5bb is formed.

The friction portion 5aa is desirably high in abrasion resistance. However, the SUS316 is austenite stainless steel that cannot be hardened using martensitic transformation. Accordingly, the upper surface of the stainless-steel sintered body is cut together with the convex 5b2, and then a nitride layer is formed on the surface of the stainless-steel sintered body by an ion nitriding method. Finally, a surface of the nitride layer is smoothed together with the surface of the convex 5*b*2 using a known lapping apparatus having a copper surface plate and polycrystalline diamond powder (with an average particle diameter of 3 μm). Accordingly, the upper surface of the convex 5*b*2 becomes flush with the friction portion 5*aa*. In the smoothing process, only the sintered body and the convex 5*b*2 projecting from the main body portion 1*b* need to be smoothed, thereby shortening the processing time. As a result, the driven body 5 with the friction portion 5*aa* can be obtained with short processing time.

Figure 4:
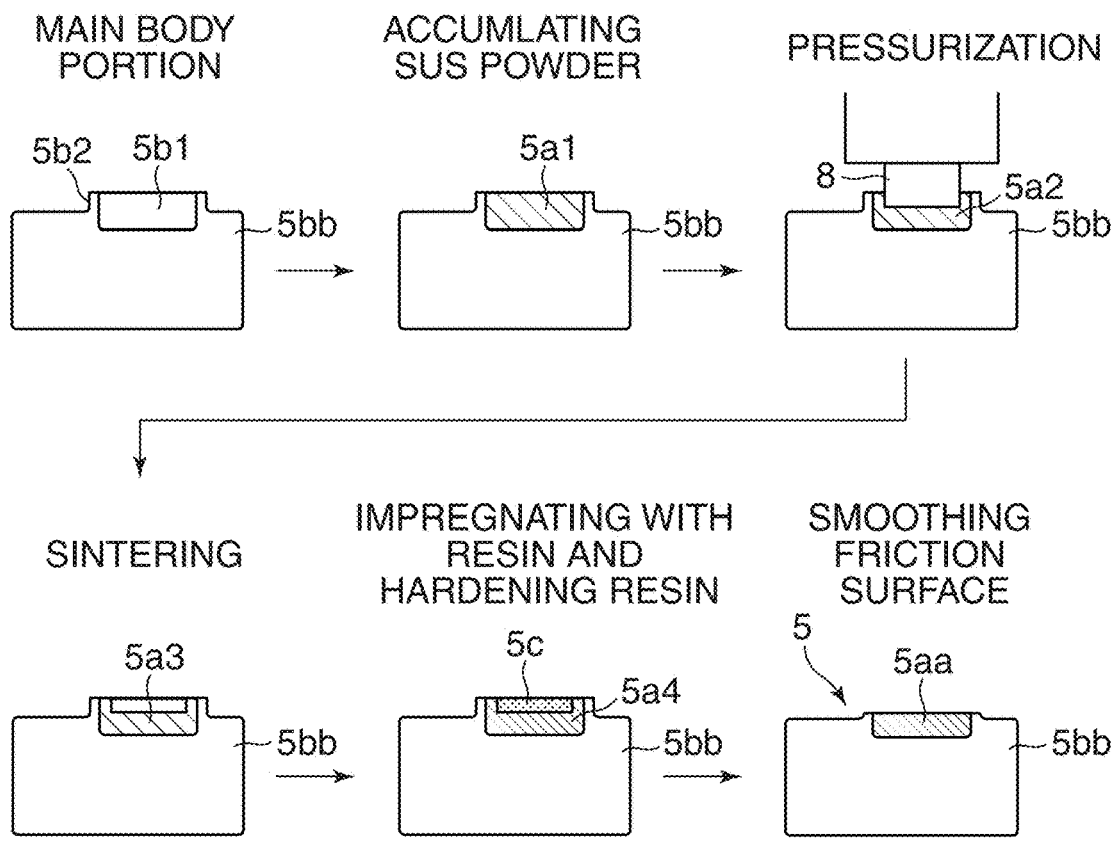
FIG. 4 is a process diagram schematically describing a second method for manufacturing a driven body.

Next, a second method for manufacturing the driven body 5 by which no nitriding treatment is performed so as to reduce the number of steps in the manufacturing process will be explained. FIG. 4 is a process diagram schematically describing the second method for manufacturing the driven body 5. The main body portion 5*bb* of the driven body 5 is manufactured by cutting SUS430 as a ferritic stainless steel, for example, but the method for manufacturing the main body portion 5*bb* is not limited to this. The thermal expansion rate of SUS430 is close to the thermal expansion rate of SUS420j2, a martensitic stainless steel as a raw material for the friction portion 5*aa*. Accordingly, the use of SUS430 for the main body portion 5*bb* makes it possible to suppress occurrence of cracks in the friction portion 5*aa* when the friction portion 5*aa* is shaped by sintering. It should be noted that the main body portion 5*bb* is desirably made from an iron-based material similar in characteristics including thermal expansion rate to the stainless-steel material used for the friction portion 5*aa*, not only from the viewpoint of suppressing the occurrence of cracks but also improving the adherence of the friction portion 5*aa* and the main body portion 5*bb* by mutual diffusion.

The main body portion 5*bb* has the concave 5*b*1 arranged in the circumferential direction thereof. The SUS420j2 powder (with an average particle diameter of 10 μm, for example) as a raw material of the friction portion 5*aa* is accumulated into the concave 5*b*1 and the powder is struck near the surface layer to form a powder accumulated portion 5*a*1 at the same height as the convex 5*b*2 with the concave 5*b*1 formed therein. It should be noted that using the martensitic stainless steel as a raw material of the friction portion 5*aa* makes it possible to harden the sintered body by quenching subsequent from the sintering process. The use of granulated powder to form the powder accumulated portion 5*a* improves the fluidity of the powder. This achieves improvement in handling property including reduction of attachment of the powder to a punch and the like used in the next pressing step. Subsequently, the powder accumulated portion 5*a* is pressed by a tubular punch 8 under a pressure of 1 to 15 tons/300 mm$^2$, for example, to form a pressed powder body 5*a*2. At that time, a sufficient clearance is produced between the inner and outer peripheral surfaces of the punch 8 (surfaces almost parallel to the pressing direction) and the inner and outer peripheral wall surfaces of the concave 5*b*1 (side wall surfaces). An area of the driven body 5 to frictionally slide on the projections 2*a* of the vibrating body 2 is near the center of the pressed powder body 5*a*2. Since the pressurizing force of the punch 8 acts in this area, the accumulating density of the SUS420j2 powder is increased in this area.

Subsequently, the main body portion 5*bb* with the pressed powder body 5*a*2 formed therein is sintered. In the sintering process, the main body portion 5*bb* is held in a vacuum atmosphere (in a vacuum furnace) at 1150° C. for one hour, for example, and the temperature is decreased to 1050° C. and the main body portion 5*bb* is held at 1050° C. for 30 minutes, and then the main body portion 5*bb* is rapidly cooled by a nitrogen gas in the same furnace. Accordingly, the powder accumulated portion 5*a* is turned into a sintered body 5*a*3 and bonded directly to and integrated with the main body portion 5*bb*. It should be noted that a separately performed hardness test has revealed that the Vickers hardness of the area of the sintered body 5*a*3 on which the pressurizing force of the punch 8 is acted in the previous pressing step was 600 HV or more. That is, it has been confirmed that the sintered body was quenched and hardened at the same time in the sintering process.

Then, the liquid epoxy resin 5*c* is applied to the concave in the sintered body 5*a*3 and is held at 50° C. for 30 minutes to decrease the viscosity of the liquid epoxy resin 5*c*, thereby impregnating some of the pores in the sintered body 5*a*3 with the liquid epoxy resin 5*c*. The impregnating treatment may be performed in the vacuum to facilitate the impregnation of the pores with the liquid epoxy resin 5*c*. After that, the liquid epoxy resin 5*c* is left at 80° C. for one hour, for example, to harden the liquid epoxy resin 5*c*. Accordingly, the sintered body 5*a*3 becomes a resin-impregnated portion 5*a*4. It should be noted that ceramic powder such as green carborundum (GC) or white alundum (WA) ceramic powder may be mixed into the liquid epoxy resin 5*c* depending on the required characteristics of the friction portion 5*aa*. This makes it possible to disperse the ceramic powder in some of the pores in the sintered body 5*a*3. The kind, particle diameter, particle shape, quantity, and the like of the added ceramic powder can be adjusted as appropriate depending on the required characteristics of the friction portion 5*aa*, taking into account the porosity, pore diameter, and the like of the sintered body 5*a*3. After the upper surface of the convex 5*b*2 and the hardened resin-impregnated portion 5*a*4 are cut, the cut surface is brought into abutment with a copper surface plate. While the copper surface plate is rotated, a polishing material (slurry) including polycrystalline diamond particles (with an average particle diameter of 3 μm) is dropped onto the copper surface plate to perform a smoothing process (polishing process). It should be noted that the convex 5*b*2 and the upper surface portion of the resin-impregnated portion 5*a*4 may be removed in a grinding process with a grinding stone made from particles of green carborundum (GC) or the like, instead of the cutting process.

Figure 5:
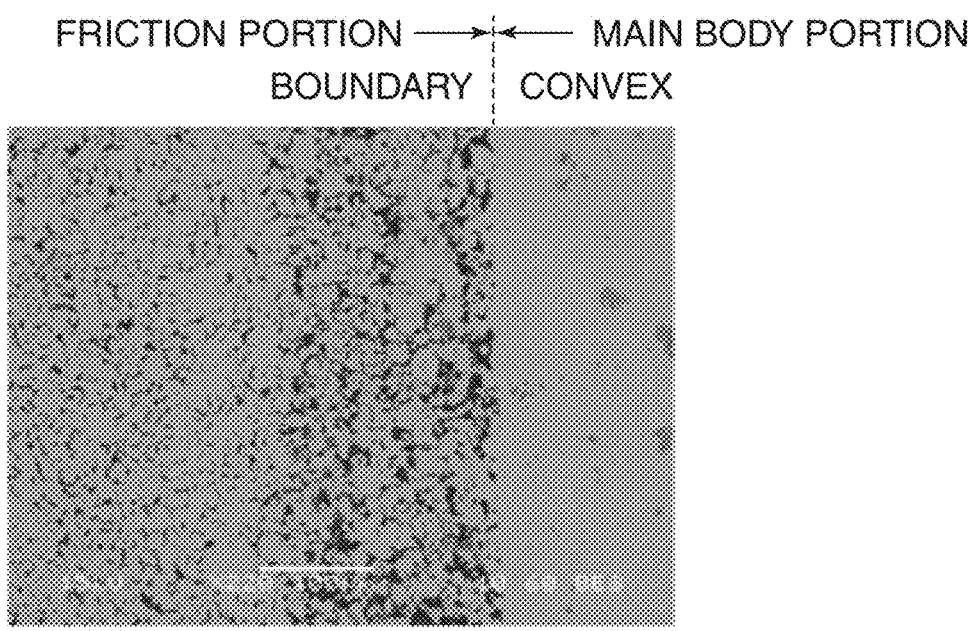
FIG. 5 is a photograph of a fine structure of polished surfaces of a friction portion and a main body portion near a boundary between them after a smoothing process.

FIG. 5 is a photograph of a fine structure of polished surfaces (front surfaces) of the friction portion 5*aa* and the main body portion 5*bb* (convex 5*b*2) near the boundary therebetween after the smoothing process. In the photograph, a large number of pores are seen in black at the boundary portion between the center of the friction portion 5*aa* (the left side of the photograph) and the main body portion 5*bb* (the right side of the photograph), and the density of the pores in the boundary portion is lower than the density of the pores in the center of the friction portion 5*aa*. This is because, in the center of the pressed powder body 5*a*2 on which the pressurizing force of the punch 8 acts directly, the density of accumulated powder is high and thus the density of the sintered body is high as well, whereas in the peripheral edge of the pressed powder body 5*a*2 on which the pressurizing force of the punch 8 does not act directly, the density of accumulated powder is low and thus the density of the sintered body is low as well. By making a difference or a gradient in the density of the sintered body between the center and the peripheral edge of the friction portion 5*aa* (boundary with the main body portion 5*bb*), it can be expected to suppress the occurrence of cracks and the like in the sintered body even though the friction portion 5*aa* and the main body portion 5*bb* as a dense body are integrally sintered. It should be noted that the similar effect of suppressing the occurrence of cracks can also be obtained in the case where the austenitic stainless steel SUS304 higher in thermal expansion ratio than SUS420j2 is used for the friction portion 5aa.

Figure 6:
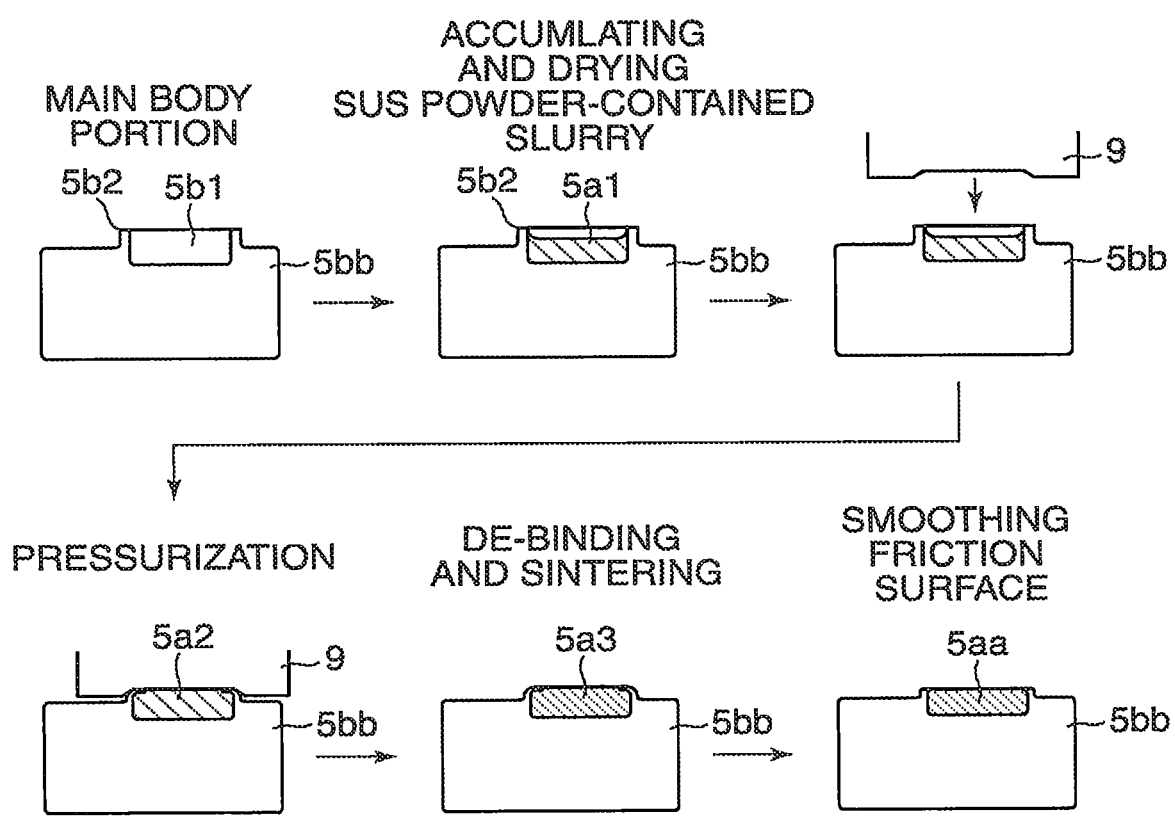
FIG. 6 is a process diagram schematically describing a third method for manufacturing a driven body.

FIG. 6 is a process diagram schematically describing a third method for manufacturing the driven body 5. The main body portion 5bb prepared is the same as the one used in the second manufacturing method and descriptions thereof will be omitted here. A slurry of SUS420j2 powder (with an average particle diameter of 10 μm) is produced. The produced slurry is accumulated into the concave 5b1 and is held and dried at 80° C. for one hour to form the powder accumulated portion 5a1. Next, the powder accumulated portion 5a1 is pressed at 170 MPa (=about 5 tons/300 mm$^2$) by a punch 9 that is cylindrical in shape and has a recess (concave) at the radial center thereof to form the pressed powder body 5a2. The recess in the punch 9 is designed to bring down the convex 5b2 toward the concave 5b1. Accordingly, when the convex 5b2 is brought down toward the powder accumulated portion 5a, the surface of the pressed powder body 5a2 becomes at almost the same height as the convex 5b2. After that, the sintering process and the smoothing process are carried out as in the second manufacturing method. Accordingly, the driven body 5 including the friction portion 5aa with a smooth surface can be obtained.

It should be noted that, when the slurry contains a large quantity of organic matter such as a binder, a de-binding (de-fatting) process is desirably performed prior to the sintering process under the condition that the pressed powder body 5a2 and the main body portion 5bb are not oxidized. After the sintering process, the sintered body 5a3 may be impregnated with an epoxy or acrylic adhesive to enhance the bonding properties of the particles constituting the sintered body 5a3. According to the third manufacturing method, the portion of the convex 5b2 bent toward the concave 5b1 side can be removed by the smoothing process (grinding process or polishing process) without being subjected to a cutting process or the like), which makes it possible to finish the surface of the friction portion 5aa in the desired state in a short time.

Figure 7:
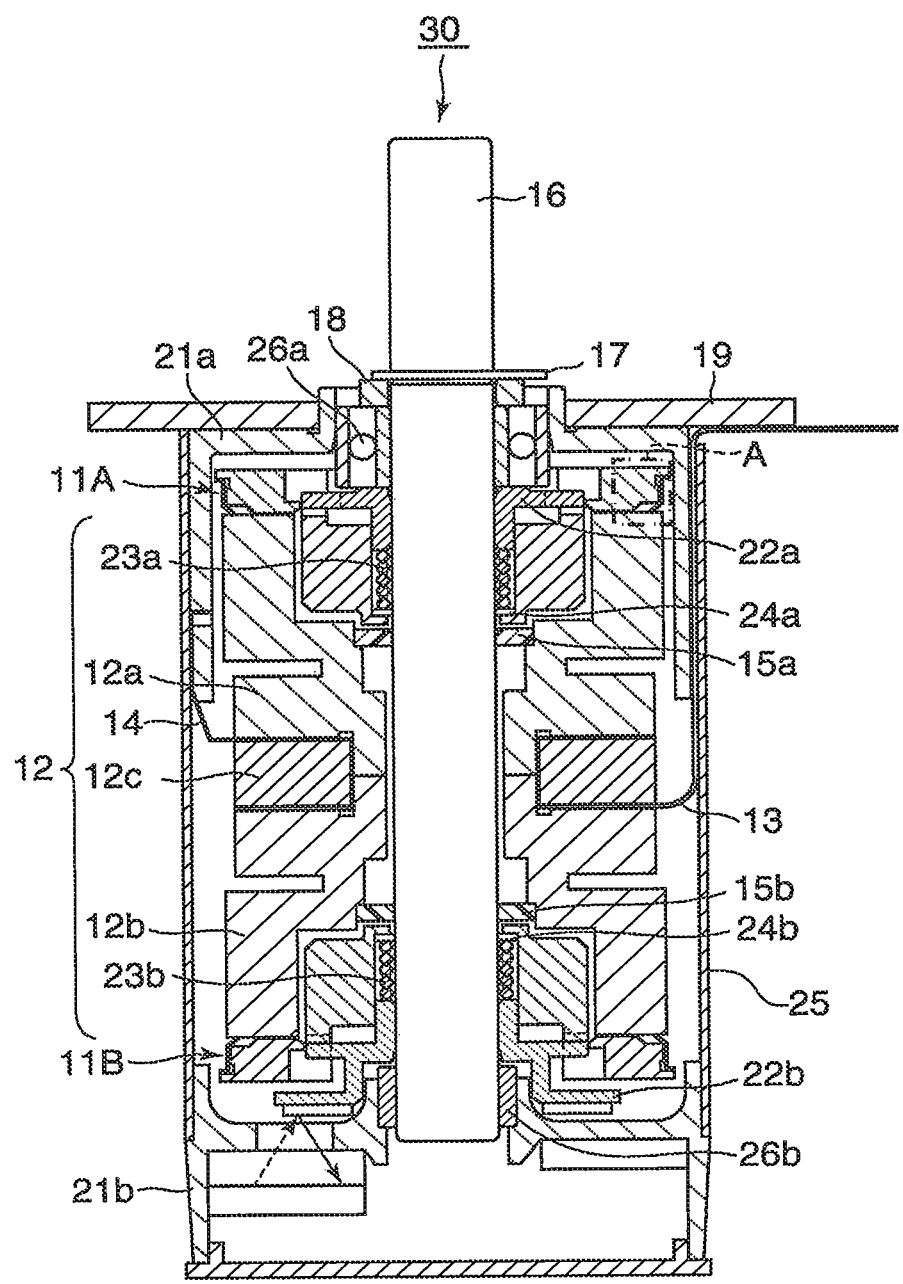
FIG. 7 is a schematic cross-sectional view for describing configuration of a third vibration-type actuator.
Figure 8:
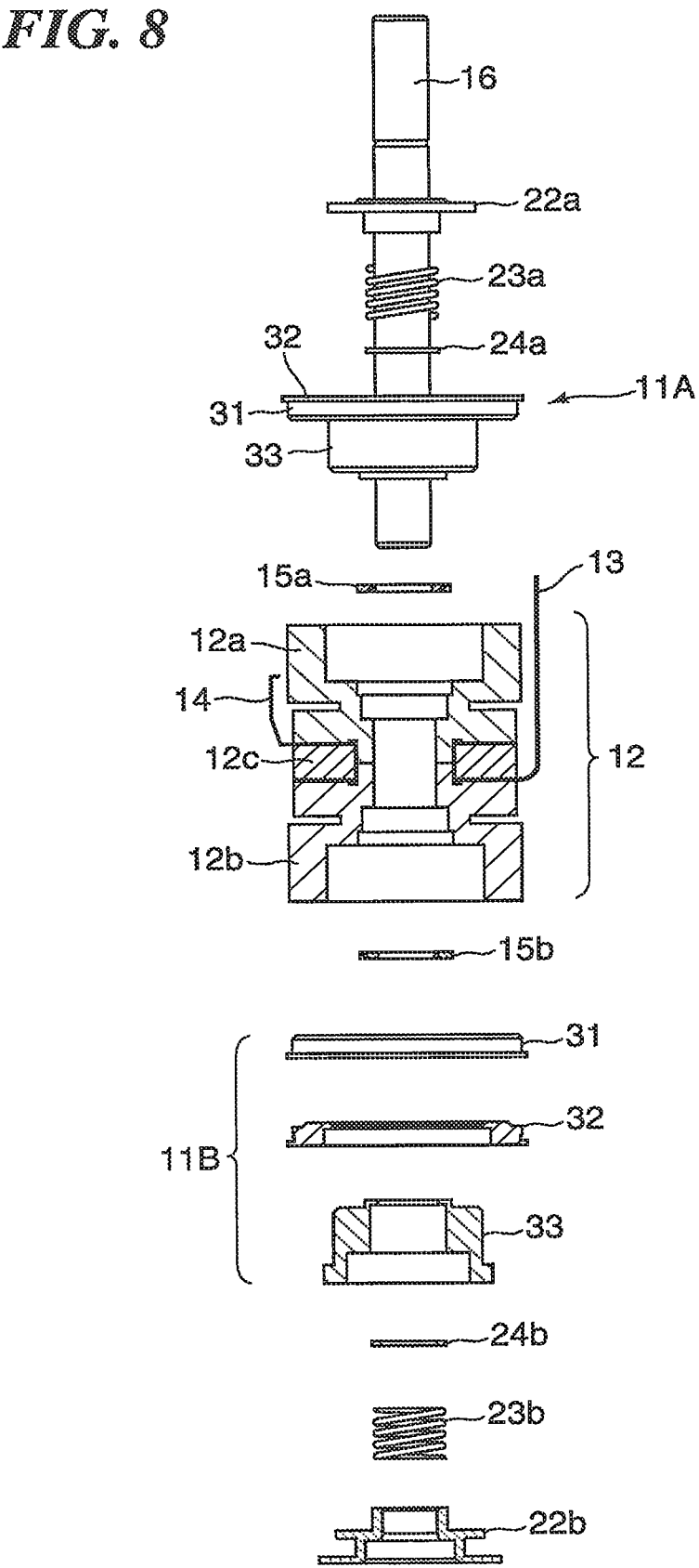
FIG. 8 is an exploded cross-sectional view of the third vibration-type actuator.

Next, a configuration example of a third vibration-type actuator using the friction member according to the embodiment of the present invention will be explained. FIG. 7 is a schematic cross-sectional view for describing configuration of a third vibration-type actuator 30. FIG. 8 is an exploded cross-sectional view of the vibration-type actuator 30, showing only main components. In the vibration-type actuator 30, briefly describing, internal components are stored in a case composed of a flange 19, a side cover 25, and housings 21a and 21b. The vibration-type actuator 30 has, as the internal components, driven bodies 11A and 11B, a vibrating body 12, a support member 14, a flexible printed wiring board 13, pressure springs 23a and 23b, and pressurizing force equalizing rings 24a and 24b. The vibration-type actuator 30 also has rotation transfer members 22a and 22b, internal bearings 15a and 15b, a shaft 16, bearings 26a and 26b, an E ring 17, and a spacer 18.

The vibration-type actuator 30 has the vibrating body 12 sandwiched between the two driven bodies 11A and 11B to generate a certain torque that is double of a torque generated by a vibration-type actuator with one driving body. In addition, the reaction force to the pressurizing force from the pressure springs 23a and 23b for pressing the two driven bodies 11A and 11B against the vibrating body 12 constitutes only tension to the shaft 16 as an output shaft in the center. Accordingly, the thrust forces resulting from the pressure springs 23a and 23b are not applied to the bearings 26a and 26b. This eliminates the need for a large bearing to receive the thrust force resulting from the pressure springs 23a and 23b with no energy loss due to the friction of such a bearing. The structure as described above achieves characteristics of small size, high torque, and high efficiency. Since the thrust force resulting from the pressure springs 23a and 23b is not applied to the bearings 26a and 26b, it is only twist reaction force resulting from the rotation torque of the driven bodies 11A and 11B that is applied to the support member 14 supporting the vibrating body 12. Accordingly, the rigidity of the shaft 16 may be small in the axial direction. In addition, the support member 14 is made soft in the direction orthogonal to the axial direction of the shaft 16 to prevent the vibration of the vibrating body 12 from being hindered. The support member 14 is fixed by being sandwiched between the housing 21a and the side cover 25. The bearing 26a is fixed to the housing 21a, and the E ring 17 is provided via the spacer 18. Accordingly, even if the thrust force is applied to the shaft 16, the pressurizing force of the friction portion (described later in detail) of the vibration-type actuator 30 is not influenced by the thrust force.

The vibrating body 12 has a piezoelectric element 12c as an electric-mechanical energy conversion element in the center, and has two elastic bodies 12a and 12b bonded to each other by electric resistance welding with the piezoelectric element 12c, the support member 14 and the flexible printed wiring board 13 sandwiched therebetween. The flexible printed wiring board 13 supplies electric power to the piezoelectric element 12c and plays the role of a terminal to detect a voltage generated as a result of the deformation of the piezoelectric element 12c.

The vibration-type actuator 30 has an almost symmetrical structure with respect to the piezoelectric element 12c in the axial direction of the shaft 16. The shaft 16 is inserted into the vibrating body 12 and the internal bearings 15a and 15b such that the vibrating body 12 is sandwiched between the resin internal bearings 15a and 15b. The vibrating body 12 is formed in an almost cylindrical shape and combines two bending vibrations to produce vibratory motion like a jumping rope. The internal bearings 15a and 15b are disposed around nodes of the vibration excited to the vibrating body 12 so as not to hinder the excited vibration. This makes it possible to secure the coaxiality of the vibrating body 12 and the shaft 16 while avoiding direct contact between the vibrating body 12 and the shaft 16. The shaft 16 penetrates through the driven bodies 11A and 11B and the pressure springs 23a and 23b pressing the driven bodies 11A and 11B against the vibrating body 12 so as to generate frictional force. The resin pressurizing force equalizing rings 24a and 24b are respectively disposed between the pressure spring 23a and the driven body 11A and between the pressure spring 23b and the driven body 11B so as to reduce uneven pressure which tends to occur at the ends of the pressure springs 23a and 23b.

The driven body 11A is formed by attaching a spring-characteristic annular metallic friction member 31 and an annular elastic body 32 to each other, smoothing a frictional surface of the metallic friction member 31, and attaching the elastic body 32 to the rotation transfer member 22a. The structure of the driven body 11B is the same as that of the driven body 11A. The rotation transfer members 22a and 22b are press-engaged with the shaft 16.

Figure 9A:
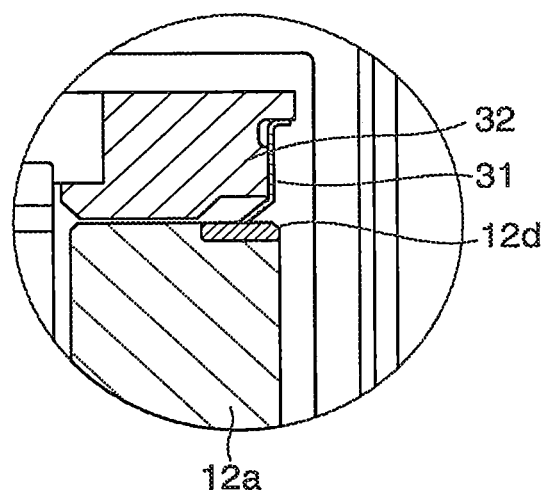
FIGS. 9A and 9B are diagrams for describing a friction portion in a vibrating body included in the third vibration-type actuator.
Figure 9B:
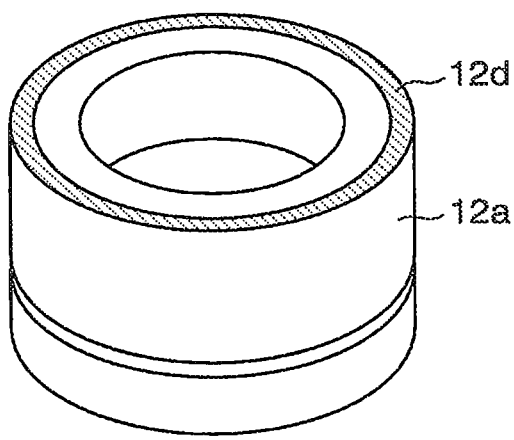

FIGS. 9A and 9B are diagrams for describing a friction portion 12d provided in the vibrating body 12. FIG. 9A is an enlarged view of a section A shown in FIG. 7. The spring-characteristic metallic friction member 31 is the second contact portion which is brought into pressure contact with the friction portion 12d (first contact portion) provided in the vibrating body 12 by extending force of the pressure springs 23a and 23b. FIG. 9B is a perspective view of the elastic body 12a. The friction portion 12d is a stainless-steel sintered body as with the driven body 5 of the vibration-type actuator 20, and is bonded to the elastic body 12a by an adhesive. A stainless-steel sintered body is generally large in vibration damping and tends to have prominently large vibration damping in particular when the pores in the sintered body are impregnated with the resin. However, when the friction portion 12d comprised of a stainless-steel sintered body is formed only in part of the elastic body 12a, no vibration damping is practically caused by the friction portion 12d. That is, providing the friction portion 12d in part of the vibrating body 12 (elastic body 12a) in such a manner as to contact the metallic friction member 31 makes it possible to secure a required characteristic of the vibrating body 12 that vibration damping is unlikely to occur. In addition, when the friction portion 12d is provided in part of the elastic body 12a as a base member, the vibration-type actuator 20 can be manufactured by the second manufacturing method or the third manufacturing method described above. At that time, the powder accumulated portion Sa1 can be easily formed in the elastic body 12a by using a jig such as a molding die or the like surrounding the outer circumference of the elastic body 12a.

Figure 10A:
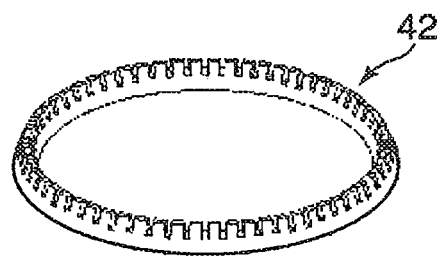
FIGS. 10A to 10D are diagrams for describing a vibrating body constituting a fourth vibration-type actuator.

Next, a configuration example of a fourth vibration-type actuator using the friction member according to the embodiment of the present invention will be explained. FIGS. 10A to 10D are diagrams for describing a vibrating body 42 constituting the fourth vibration-type actuator. FIG. 10A is a perspective view of the vibrating body 42. A piezoelectric element not shown is bonded to the lower surface of the vibrating body 42. The vibrating body 42 is used in a known vibration-type actuator that applies rotational driving force to a driven body not shown brought into pressure contact with the upper surface of the vibrating body 42 as a friction portion by exciting progressive driving vibration traveling in the circumferential direction (traveling wave). The upper surface of the vibrating body 42 is formed in a comb-tooth shape in which concaves and convexes are alternated circumferentially at constant intervals to increase vibration displacement excited to the vibrating body 42.

Figure 10B:
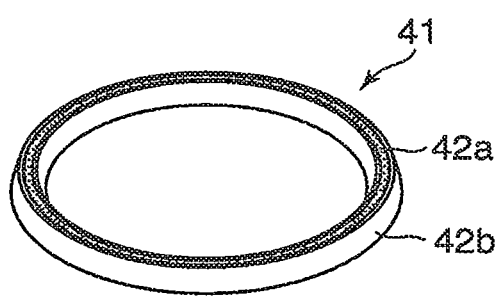
Figure 10C:
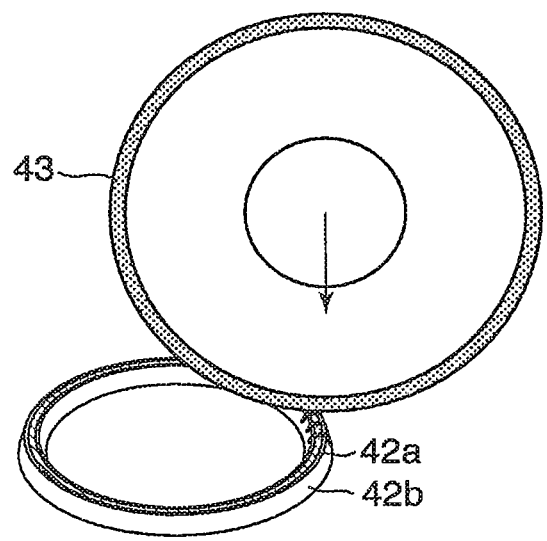
Figure 10D:
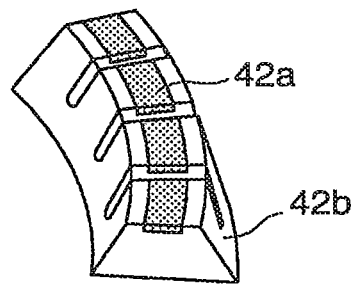

FIG. 10B is a perspective view of a precursor 41 for use in manufacture of the vibrating body 42 (component to be processed to the vibrating body 42). FIG. 10C is a diagram schematically describing a method for processing the precursor 41. FIG. 10D is a cross-sectional view of the vibrating body 42. To form the comb-toothed friction portion, forming the individual convexes with a friction portion made of a stainless-steel sintered body is not desired because the manufacturing process would be complicated. Thus, for example, an annular main body portion 42b with a circumferential groove is prepared, and a friction member 42a made from a stainless-steel sintered body capable of being fitted into the groove of the main body portion 42b is prepared. It should be noted that the friction member 42a can be manufactured in the same manner as the driven body 5 of the vibration-type actuator 20. An adhesive is applied into the groove in the main body portion 42b, and the friction member 42a (second contact portion) is fitted into the groove. Accordingly, the smoothing process described above is performed on the upper surface of the main body portion 42b to which the friction member 42a is bonded, thereby obtaining the precursor 41. Alternatively, the friction member 42a of a stainless-steel sintered body is formed in the concaves and then the smoothing process described above is performed on the upper surface to obtain the precursor 41 as by the second or third method for manufacturing the vibration-type actuator 20. It should be noted that a friction portion similar to the friction portion 1a of the vibration-type actuator 10 may be formed on an upper surface of an annular main body part with no concaves by the screen printing method described above. In the case of applying slurry, the main body portion 42b may be rotated to equalize the thickness of the applied film by centrifugal force as used in a spin-coating manner.

An upper surface of the obtained precursor 41 is cut by a cutter 43 as shown in FIG. 10C to form the grooves (concaves), whereby the upper surface of the precursor 41 is processed in a comb-toothed shape. Accordingly, as shown in FIG. 10D, the vibrating body 42 in which the friction members 42a are respectively disposed on the upper surfaces of the individual convexes on the main body portion 42b can be obtained. The friction member 42a provides the same advantages as those of the driven bodies 1 and 5.

Next, the operating characteristics of the various vibration-type actuators described above, in particular, the starting characteristics of the vibration-type actuators after being left in a high-humidity environment will be explained. Vibration-type actuators deteriorate in starting characteristics after being left in a high-humidity environment. That is, when no frictional driving force resulting from the vibration excited to the vibrating body acts efficiently on the driven body, the speed of the relative movement of the vibrating body and the driven body becomes slow in the initial state. This is possibly because, when the vibration-type actuator is left in a humid environment, water molecules are absorbed to the friction surfaces of the vibrating body and the driven body to make the friction surfaces more slippery. In particular, when the vibration-type actuator is left in a high-humidity environment, water exists as a water film on the friction surfaces to make the friction surfaces still more slippery.

The reason why leaving the vibration-type actuator in a humid environment makes the friction surfaces slippery can be explained taking a mixed lubrication state and a fluid lubrication state into consideration. That is, strong frictional force can be obtained by the solid real contact portions in a dry environment (low-humidity environment), but when water exists between the friction surfaces, the water film supports the force in the direction vertical to the friction surfaces to decrease the solid real contact area. Since water is very less resistant to force in the direction of shearing unlike solid matter. Accordingly, the ratio of the area supported by the water at the starting of the vibration-type actuator becomes easily larger to weaken the frictional force on the friction surfaces of the driven body and the vibrating body. In addition, the holding torque (holding force) of the vibration-type actuator decreases under the influence of the water existing on the friction surfaces of the driven body and the vibrating body for the same reason as that of the deterioration in the starting characteristics. This case can also be explained taking the mixed lubricant state and the fluid lubrication state described above into consideration.

To handle this issue, each of the friction portions 1a, 2aa, 5aa, and 42a as friction members according to the embodiment includes a stainless-steel sintered body with vacancies. Accordingly, even though there exists water resulting from humidity or the like between the friction surface of the friction member and the friction surface of another member in frictional contact with the friction member, the water can move to the pores in the sintered body, thereby suppressing decrease in the real contact area between the friction surfaces. Therefore, applying the friction member according to the embodiment to at least one of the friction surfaces of the vibrating body and the driven body in frictional contact with each other makes it possible to suppress decrease in the real contact area of the friction surfaces of the vibrating body and the driven body. That is, the vibration-type actuator in which at least one of the friction surfaces of the vibrating body and the driven body in frictional contact with each other is made from the friction member according to the embodiment can suppress degradation in the starting characteristics thereof after being left in a high-humidity environment.

Next, the results of a test with an example having the configuration of the vibration-type actuator 20 will be explained. At the test, the driven body 5 shown in FIG. 3C was used in the vibration-type actuator 20.

Figure 11:
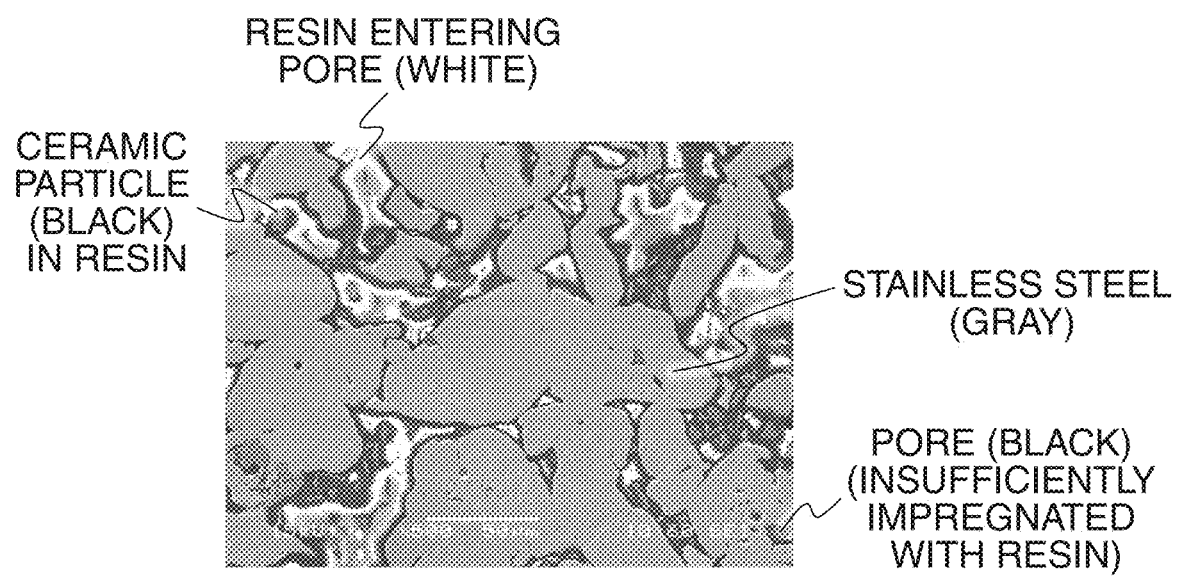
FIG. 11 is an electron microscope photograph of a friction surface of a friction portion of a driven body of Example 3.

Vibration-type actuators of Examples 1 to 3 were manufactured with the driven bodies 5. The vibration-type actuator of Comparative Example 1 had the driven body that was made from a SUS420j2 ingot material cut out from a round bar formed by flat-rolling a casting billet fabricated by a normal stainless steel fabricating method and was with a nitride layer on a friction surface by an ion nitriding method. It should be noted that the SUS420j2 ingot material has a dense tissue (fine structure). The vibration-type actuator of Example 1 had the driven body 5 made from a stainless-steel sintered body of SUS420j2 powder and rapidly cooled after being held at the sintering temperature in the sintering process to undergo the quenching treatment (hardening process). The vibration-type actuator of Example 2 had the driven body 5 that was formed by shaping SUS316 powder in an annular body by a known shaping method, sintering the shaped powder body under predetermined conditions, and then impregnating the stainless-steel sintered body having a nitride layer with an epoxy resin as shown in FIG. 3B. The vibration-type actuator of Example 3 had the driven body 5 that was formed by impregnating a stainless-steel sintered body equivalent to the driven body 5 used in Example 1 with an epoxy resin containing GC #2000 as ceramic powder. FIG. 11 is an electron microscope photograph of the friction surface (fine structure) of the friction portion of the driven body 5 of Example 3. It can be seen from the photograph that there are pores between the bonded stainless-steel particles and some of the pores are impregnated with a resin containing ceramic powder. The driven bodies 5 used in the vibration-type actuators of Examples 1 to 3 can be manufactured by the method for manufacturing the driven body 5 of the vibration-type actuator 20 described above.

Each of the manufactured vibration-type actuators of Examples 1 to 3 was driven and reciprocated seventy thousand times within a 0 to 50° rotation angle range of the driven body, and then reciprocated five thousand times within a 50 to 100° rotation angle range. The reciprocation driving generates a fit state of the projections 2a and the friction surface 5d. In the fit state, the distance between the two friction surfaces around the real contact portions become shorter. In the fit state, areas of the projections 2a in contact with the friction surface 5d increase, and areas of the two friction surfaces close to each other increase accordingly. After the fit state of the projections 2a and the friction surface 5d has been generated, the friction surfaces are further influenced by humidity and are more slippery. That is, when the friction member and the opposed member are in contact by certain areas (real contact portions) and the distance between the surfaces of the two members is compared between before the generation of the fit (pre-fit) state and after the generation of the fit (post-fit) state, distances between the portions not in contact with each other in the post-fit state become shorter than distances between the same in the pre-fit state. When water (water molecules) exists between the not-contacting portions in the two surfaces in that state, the water supports the normal force such as to decrease the real contact area and lower the shear force of the friction surfaces (friction coefficient). Meanwhile, when no water exists between the non-contacting portions in the two surfaces, the real contact area increases due to the generation of fit state such as to provide a high friction coefficient. Therefore, there arises a large difference in slipperiness of the friction surfaces depending on the presence or absence of water in portions in which the fit state is generated. This is why the foregoing reciprocation driving is carried out to make more effective the influence of the water on the friction surfaces.

Each of the vibration-type actuators after the reciprocation driving was left for 12 hours in a high-humidity environment in which the temperature was 60° C. and the relative humidity was 90%, and was moved to an ambient-temperature environment (in which the temperature was 25° C. and the relative humidity was 50%) and left there for two hours, and then its holding torque was measured in the circumferential direction of the driven body 5. It should be noted that the holding torque was measured in such a manner as described below. That is, the driven body 5 and the three vibrating bodies 2 were arranged as shown in FIG. 3A, and the pressurizing force applied to them was set to 900 gf (9N). In this case, a load of 150 gf was applied to each of the projections 2a. The contact portions of the projections 2a were almost circular in shape. When the diameter of the contact portions is 0.9 mm, the apparent surface pressure is 235 gf (24N)/mm$^2$. A shaft member passing through the radial center of the vibration-type actuator and orthogonal to the radial direction was arranged, the shaft member and the driven body 5 were coupled together, and the shaft member was rotated to rotate the driven body 5 to allow the driven body 5 to rotate and move relative to the projections 2a. A pulley was attached to the shaft member, an elastic thread was wounded around the pulley, and then the thread was wound up by an extension tester and the pulley was rotated to rotate the shaft member. The holding torque was determined from the value obtained by converting the output from a load cell in the extension tester into force.

It should be noted that, at this test, external force was dynamically applied to the driven body 5 via the thread to grasp continuous changes in frictional resistive force in the meantime. In this case, a value of a top of a saw blade equivalent to the frictional force generated by a stick-slip phenomenon was read as holding torque. Since the maximum speed at which the stick-slip phenomenon appeared was 2 mm/min, this maximum speed was used as the relative movement speed of the projections 2a and the driven body 5 to determine the holding torque for the purpose of shortening the measurement time.

Figure 12:
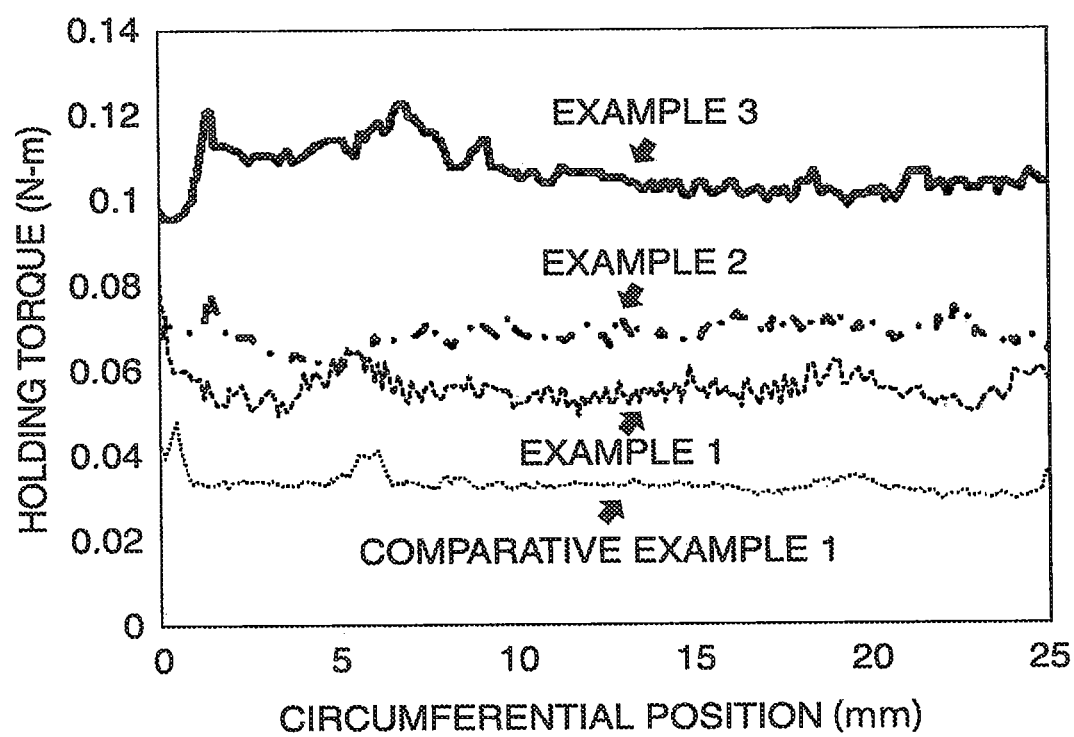
FIG. 12 is a diagram showing measurement results of holding torque of vibration-type actuators of Examples 1 to 3 and Comparative Example 1.

FIG. 12 is a diagram showing the measurement results of holding torque. In the initial state, the driven body 5 developed comparatively high torque, but as the relative positions of the projections 2a and the friction surface 5d changed, the holding toque of the driven body 5 decreased as compared to that of the initial state. It can be seen from the results that the initial real contact portions were held to maintain the high holding torque in the initial state even in a high-humidity environment, but after the relative positions of the friction surfaces changed, the holding torque was sharply reduced under the influence of the water film described above. That is, it is assumed that the water (water molecules) was absorbed on the friction surface 5d to exist as a water film between the projections 2a and the friction surface 5d, thereby reducing the frictional force between the friction surfaces.

In Comparative Example 1, the stick-slip phenomenon (the fluctuation range of holding torque) was small possibly because the friction surfaces were nearly in a fluid lubrication state. In contrast, in Examples 1 to 3, the fluctuation range of holding torque is wide possibly because the friction surfaces were brought into a mixed lubrication state in which the relative speed and friction coefficient of the friction surfaces were in a negative relationship and the stick-slip phenomenon appeared more prominently than in Comparative Example 1.

The order of magnitude of holding torque was Comparative Example 1<Example 1<Example 2<Example 3. The holding torque of Example 3 was 0.96 kgf·cm [0.10 N·m], which was three times higher about 0.30 kgf·cm [0.03 N·m] of holding torque of Comparative Example 1. In Example 1, even though the water attached to the friction surface 5d, the pores absorbed the water to secure the real contact portions between the friction surface 5d and the projections 2a, thereby resulting in the higher holding torque than that in Comparative Example 1.

In all of Comparative Example 1 and Examples 1 to 3, the holding torque of the portion of the friction surface 5d having not undergone the reciprocation driving before being left in a high-humidity environment (without generation of the fit state) was higher than that of the portion of the friction surface 5d having undergone the reciprocation driving. It is assumed from this that repeating the frictional sliding and generating a fit state of the friction surfaces makes the influence of the water film more prominent. In Examples 2 and 3, an oxide film and a resin transfer film were generated through the friction in the stainless portion on the friction surface 5d after the reciprocation driving, and these films prevented direct metal contact between the projections 2a and the stainless-steel material constituting the friction member. As a result, the friction member used in Example 2 (the stainless-steel sintered body impregnated with a resin) was higher in abrasion resistance than the friction member used in Example 1 (the stainless-steel sintered body not impregnated with a resin). The holding torque in Example 2 was higher than that in Example 1 because the progress of generating the fit state in Example 2 was slower than that in Example 1 due to the difference in abrasion resistance, and the state of the friction surfaces was less changed from an initial manufactured state.

Similarly, it is assumed that the holding torque in Example 3 was higher than that in Example 2 due to the difference in abrasion resistance resulting from the presence or absence of ceramic powder. That is, high abrasion resistance can be obtained in a structure in which a friction surface has a hard film unlikely to cause diffusion reaction with an opposed member such as in a structure in which a resin contains ceramic powder. The holding torque in Example 3 was higher than that in Example 2 because the progress of generating the fit state in Example 3 was slower that in Example 2 due to the difference in abrasion resistance, and the state of the friction surfaces was less changed from the initial manufactured state.

It should be noted a stainless steel is high in deformation resistance and corrosion resistance and hence is suitable as a friction member, but an oxide film on a surface of the stainless steel may be broken and cause metal adhesion (or seizure) depending on friction conditions. To solve this problem, impregnating some of pores in the stainless-steel sintered body with a resin allows the resin having entered the pores to move and adhere to the friction surfaces, thereby preventing direct metal contact and suppressing occurrence of metal adhesion (or seizure). In addition, since a friction member with pores (stainless-steel sintered body) is used in each of Examples 1 to 3 to make high substantial surface pressure on the friction surface of the friction member. As a result, the friction member used in each of Examples 1 to 3 is inferior in abrasion resistance to the dense stainless material used in Comparative Example 1, unless the friction surface is subjected to hardening treatment. Accordingly, in the case of using a stainless-steel sintered body with pores, it is desired to harden the stainless-steel sintered body by subjecting the friction member to quenching treatment or subjecting at least the friction surface of the friction member to a nitriding treatment, taking abrasion resistance (durability) into account. In the case of performing the nitriding treatment, the stainless-steel sintered body has a layer containing nitrogen depending on the conditions for the nitriding process and the depth from the surface (a layer of nitride phase (compound phase), a layer in which nitrogen is diffused, a layer intermediate between the foregoing layers, and the like). The layer of nitride phase is a layer including a nitride in which chrome in stainless steel, iron, and nitrogen are combined. The layer in which nitrogen is diffused is a layer in which nitrogen atoms are diffused in the lattice of stainless steel. The intermediate layer is a layer in which nitrogen atoms and chrome atoms are closely assembled to each other but are not stably combined.

Next, the results of a test with a variation of the second vibration-type actuator 20 shown in FIG. 3D will be explained. Vibration-type actuators in Comparative Example 2 and Examples 4 to 6 were manufactured using the driven bodies 5 with the different friction portions 5aa. The vibration-type actuator of Comparative Example 2 had the driven body 5 in which an annular member as the friction portion 5aa made from a SUS420j2 ingot material was bonded to the concave 5b1 of the main body portion 5bb by an adhesive and a nitride layer was formed on the surface of the annular member as a friction surface to the projections 2a by the ion nitriding method. It should be noted that the SUS420j2 ingot material was cut out from a round bar formed by flat-rolling a casting billet fabricated by a normal stainless steel fabricating method and had a dense tissue (fine structure).

The vibration-type actuator of Example 4 had the driven body 5 with the friction portion 5aa made from a stainless-steel sintered body of SUS420j2 powder and rapidly cooled after being held at the sintering temperature in the sintering process to undergo the quenching treatment (hardening process). The vibration-type actuator of Example 5 had the driven body 5 with the friction portion 5aa formed by impregnating a stainless-steel sintered body equivalent to the friction portion 5aa used in Example 4 with an epoxy resin. The vibration-type actuator of Example 6 had the driven body 5 formed by impregnating a stainless-steel sintered body equivalent to the friction portion 5aa used in Example 4 with an epoxy resin containing green carborundum ceramic powder. The method for manufacturing the driven bodies 5 used in Examples 4 to 6 is as explained above with reference to FIG. 4. Accordingly, in the driven bodies 5 used in Examples 4 to 6, the stainless-steel sintered bodies as the friction portions 5aa are formed by sintering integrally with the main body portions 5bb.

Each of the manufactured vibration-type actuators was subjected to reciprocation driving as with Examples 1 to 3 and Comparative Example 1. Accordingly, the fit state was generated at the friction surfaces of the projections 2a and the friction portion 5aa. After that, the vibration-type actuators of Examples 4 to 6 and Comparative Example 2 were left in a high-humidity environment under the same conditions as those for Examples 1 to 3 and Comparative Example 1, and their holding torques were measured in the circumferential direction of the driven body 5 by the same procedures as the procedures for Examples 1 to 3 and Comparative Example 1.

Figure 13:
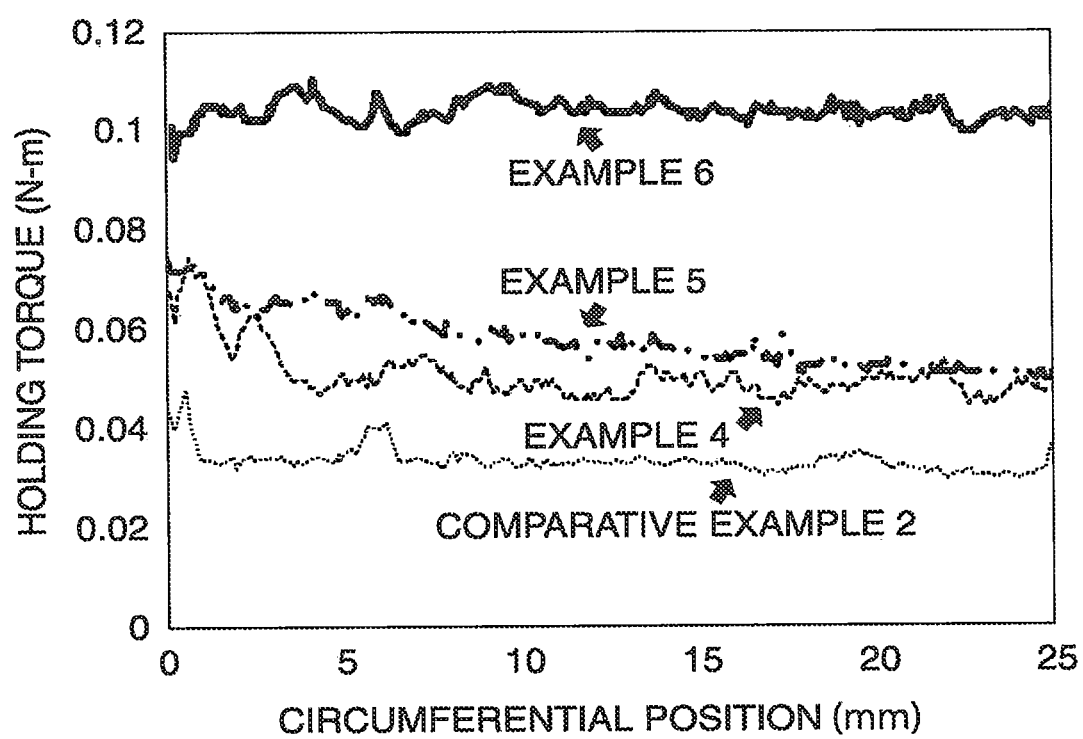
FIG. 13 is a diagram showing measurement results of holding torque of vibration-type actuators of Examples 4 to 6 and Comparative Example 2.

FIG. 13 is a diagram showing the measurement results of holding torque. In the initial state, the driven body 5 (the friction portion 5aa) developed comparatively high torque, but when the relative positions of the projections 2a and the friction portion 5aa changed, the holding toque of the driven body 5 decreased as compared to that of the initial state.

It can be seen from the results that the initial real contact portions were held to maintain the high holding torque in the initial state even in a high-humidity environment, but after the relative positions of the friction surfaces changed, the holding torque was sharply reduced under the influence of the water film described above. That is, it is assumed that the water (water molecules) was absorbed on the friction surface of the friction portion 5aa to exist as a water film between the friction surfaces of the projections 2a and the friction portion 5aa, thereby reducing the frictional force between the friction surfaces.

The order of magnitude of holding torque was Comparative Example 2<Example 4<Example 5<Example 6. The holding torque of Example 6 was 1.00 kgf·cm [0.10 N·m], which was three times higher about 0.30 kgf·cm [0.03 N·m] of holding torque of Comparative Example 2. In Example 4, even though the water attached to the friction surface of the friction portion 5aa, the pores absorbed the water to secure the real contact portions between the friction surface of the friction portion 5aa and the projections 2a, thereby resulting in the higher holding torque than that in Comparative Example 2.

In all of Comparative Example 2 and Examples 4 to 6, the holding torque of the portion of the friction portion 5aa having not undergone the reciprocation driving before being left in a high-humidity environment (without generation of the fit state) was higher than that of the portion of the friction portion 5aa having undergone the reciprocation driving. It is assumed from this that repeating the frictional sliding and generating a fit state of the friction surfaces makes the influence of the water film more prominent. In Examples 5 and 6, an oxide film and a resin transfer film were generated through the friction in the stainless portion on the friction surface of the friction portion 5aa after the reciprocation driving, and these films prevented direct metal contact between the projections 2a and the stainless-steel material constituting the friction portion 5aa. As a result, the friction portion 5aa used in Example 5 (the stainless-steel sintered body impregnated with a resin) was higher in abrasion resistance than the friction portion 5aa used in Example 4 (the stainless-steel sintered body not impregnated with a resin). The holding torque in Example 5 was higher than that in Example 4 because the progress of generating the fit state in Example 5 was slower than that in Example 4 due to the difference in abrasion resistance, and the state of the friction surfaces was less changed from an initial manufactured state.

Figure 14A:
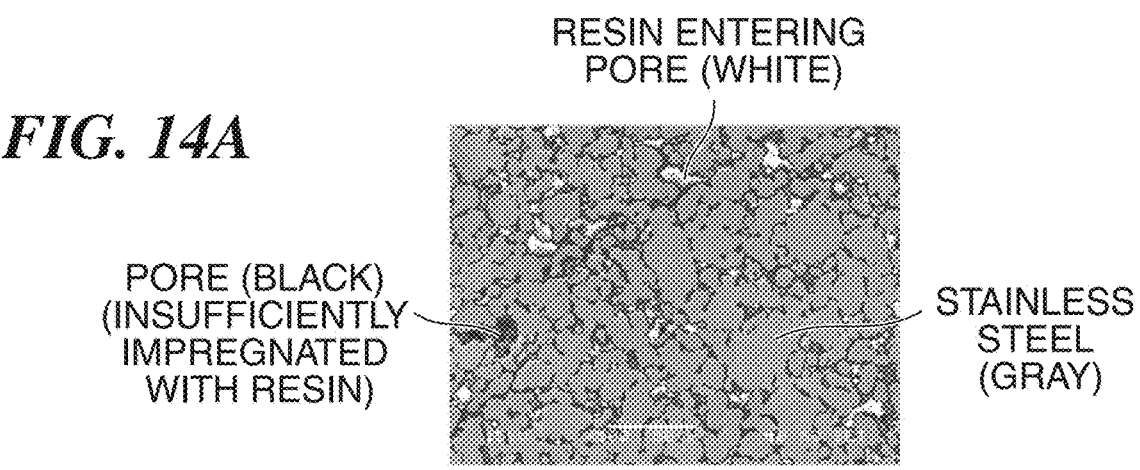
FIG. 14A is an electron microscope photograph of a friction surface of a friction portion of Example 5 before reciprocation driving.
Figure 14B:
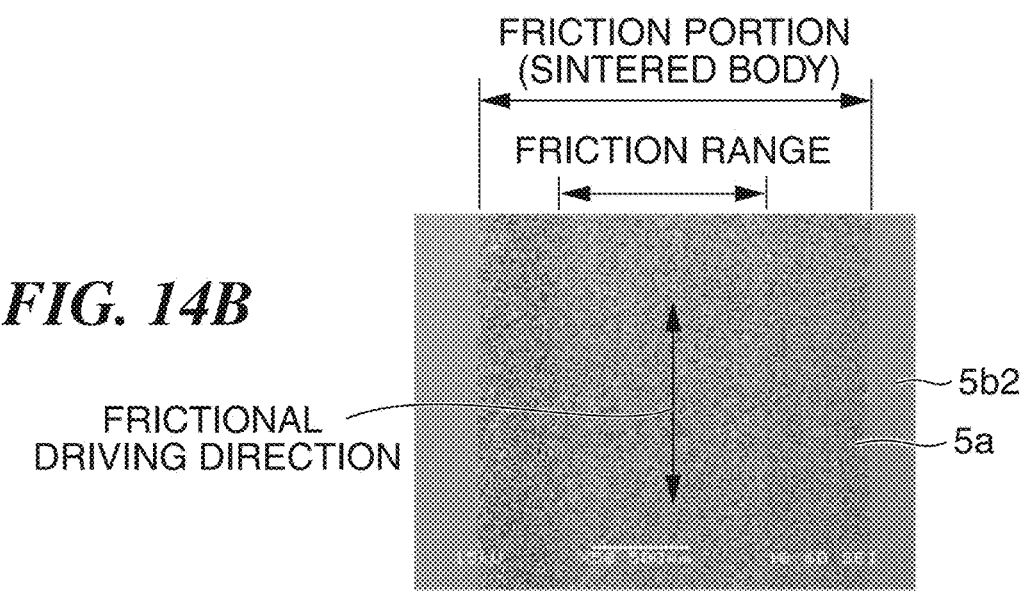
FIG. 14B is an electron microscope photograph of the friction surface of Example 5 after seventy thousand-time reciprocation driving.
Figure 14C:
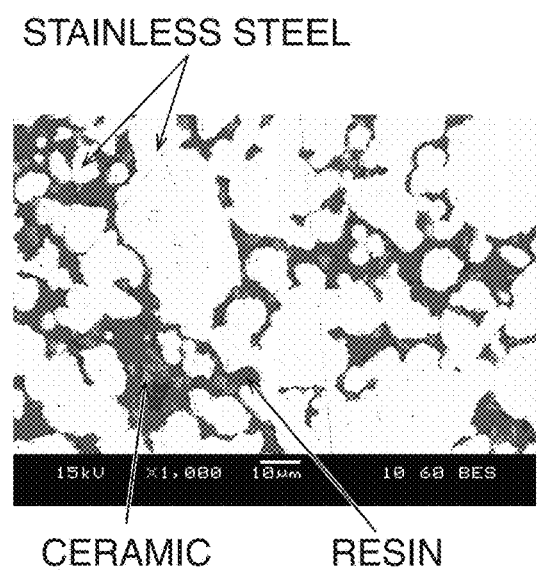
FIG. 14C is an electron microscope photograph of a friction surface of a friction portion of Example 6 before reciprocation driving.

FIG. 14A is an electron microscope photograph of the friction surface (fine structure) of Example 5 before reciprocation driving. It can be seen from the photograph that pores exist between the bonded stainless-steel particles and some of the pores are impregnated with a resin. FIG. 14B is an electron microscope photograph of the friction surface of Example 5 after seventy thousand-time reciprocation driving. Brown abrasion powder was observed in the pores within a range of frictional sliding, and the abrasion powder was confirmed to be hematite [Fe (Cr)$_2$O$_3$] from its color and analyzed components. FIG. 14C is an electron microscope photograph of the friction surface (fine structure) of Example 6 before reciprocation driving. It can be seen from the photograph that the resin is dispersed in patches in the stainless steel, and ceramic particles (ceramic powder) are dispersed in the patchy resin.

Figure 15:
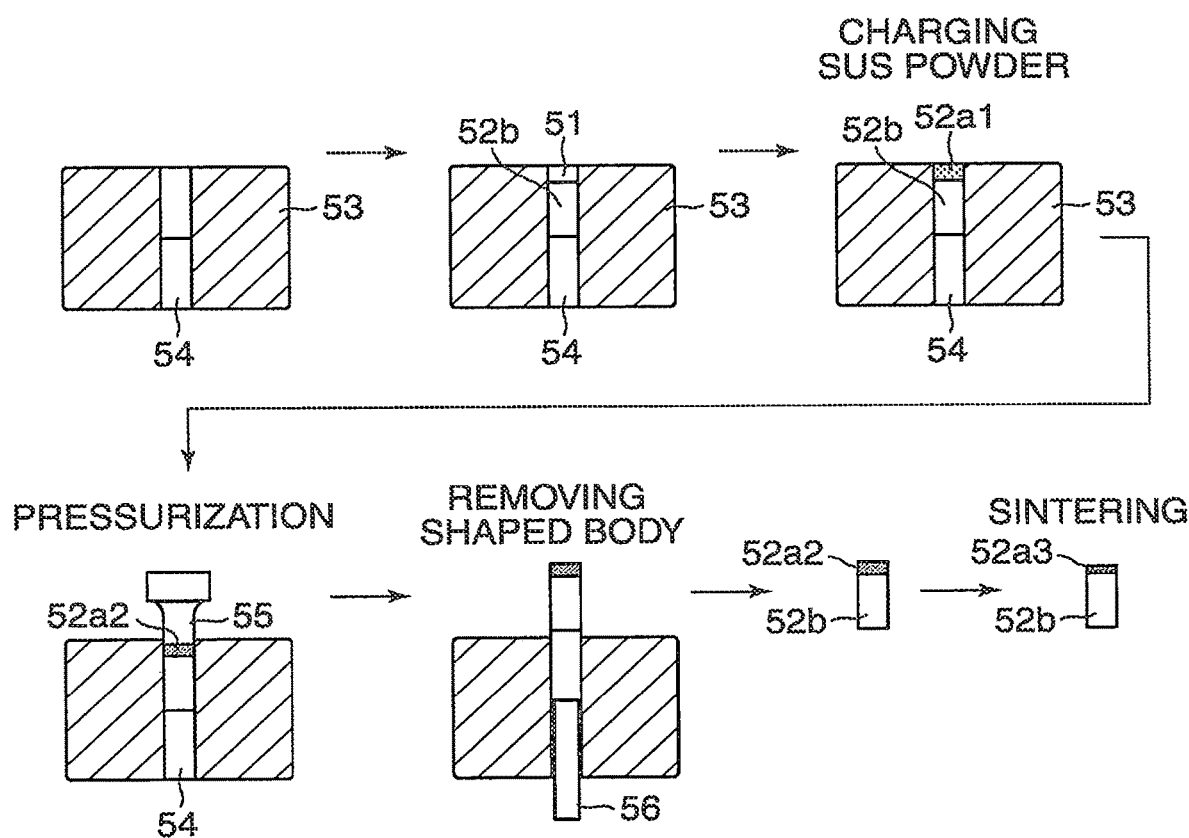
FIG. 15 is a diagram schematically describing a method for manufacturing a friction member using molding dies.

Next, another method for manufacturing a friction member according to the present invention will be explained. FIG. 15 is a diagram schematically showing a method for manufacturing a friction member by molding dies. In this example, the friction member is formed on a test pin of a pin-on-disk friction tester (JIS R 1613-1993). The friction member in the vibration-type actuator 30 can also be manufactured by the same method. It should be noted that this method is suitable for the case of manufacturing the friction member with no wall portion of a base member to be integrally formed with the friction member on the circumference of the friction member (the case in which the friction member is not formed in a concave).

A cylindrical second molding die 54 is inserted into a cylindrical space of a first molding die 53. In this case, there is a constant clearance between the first molding die 53 and the second molding die 54, and the second molding die 54 is movable in the thrust direction (the vertical direction in the drawing) in the cylindrical space into which the second molding die 54 is inserted. Subsequently, a cylindrical elastic body 52b as a basic member constituting the friction member (sintered body) is inserted into the cylindrical space of the first molding die 53 as with the second molding die 54 in such a manner as to form a spatial portion 51 for charging stainless steel powder into the cylindrical space of the first molding die 53. The stainless-steel powder is charged into the spatial portion 51 to form a powder charged portion 52a1. The powder charged portion 52a1 is pressurized and compressed by using a punch 55 to form a shaped body 52a2.

Subsequently, the second molding die 54 is pressed toward the elastic body 52b by a knockout pin 56 to remove the shaped body 52a2 and the elastic body 52b from the first molding die 53. At that time, the elastic body 52b and the shaped body 52a2 are bonded together and the shaped body 52a2 is not separated from the elastic body 52b without application of strong force. It should be noted that the strength and density of the shaped body 52a2 can be adjusted by adjusting the kind of the binder for bonding the stainless-steel powder, the ratio of the applied binder to the stainless-steel powder, and the pressurizing and shaping force from the punch 55. The shaped body 52a2 integrated with the elastic body 52b is sintered under the same conditions as the sintering conditions for the pressed powder body 5a2 described above with reference to FIG. 4 to turn the shaped body 52a2 into a sintered body 52a3 firmly bonded to the elastic body 52b. An upper surface of the sintered body 52a3 is smoothed by a grinding process or a polishing process to obtain a friction test pin with the sintered body 52a3 as a friction member. By the same method as described above, the friction member of the vibration-type actuator 30 can be obtained. It should be noted that a side surface of the sintered body 52a3 (circumferential curved surface) may not be subjected to any process after sintering because the side surface does not function as a friction surface.

Figure 16:
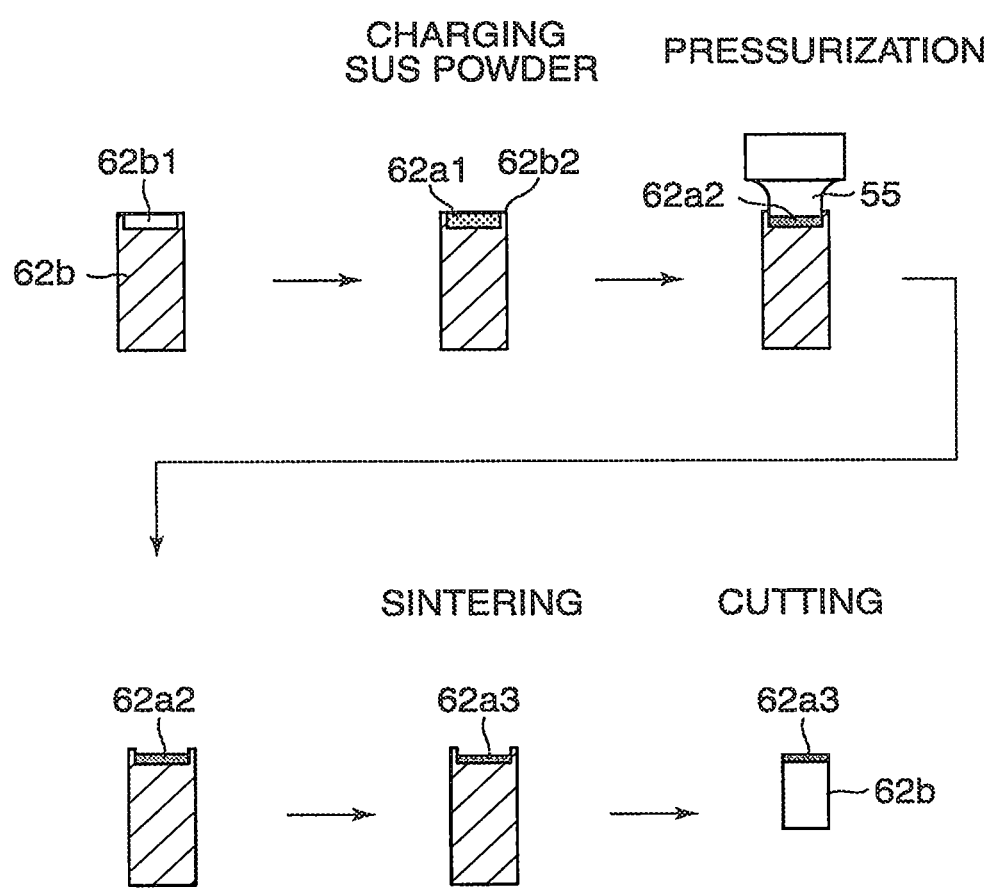
FIG. 16 is a diagram schematically describing another method for manufacturing a friction test pin on which a friction member is formed.

FIG. 16 is a diagram schematically showing another method for manufacturing a friction test pin provided with a friction member. For an elastic body 62b as a basic material for constituting the friction member (sintered body), an easily available SUS304 round bar with a diameter of 10 mmφ is prepared and cut in one end surface to form a concave 62b1 with a side wall 62b2. However, the diameter of the elastic body 62b is not limited to 10 mmφ. Stainless-steel powder (for example, SUS316L) is accumulated into the concave 62b1 of the elastic body 62b to form a powder accumulated portion 62a, and the powder accumulated portion 62a is pressurized and compressed by the punch 55 to form a shaped body 62a2. The shaped body 62a2 integrated with the elastic body 62b is sintered under the same conditions as the sintering conditions for the pressed powder body 5a2 described above with reference to FIG. 4 to turn the shaped body 62a2 into a sintered body 62a3 firmly bonded to the elastic body 62b. Finally, the side wall 62b2 is removed by a cutting process (a cylindrical grinding process, for example) and an upper surface of the sintered body 62a3 is smoothed. Accordingly, a friction test pin with the sintered body 62a3 as a friction member can be obtained. By the same method as described above, the friction member of the vibration-type actuator 30 can be obtained.

According to the foregoing method for manufacturing the friction member, unlike the shaping method using the first molding die 53 described above with reference to FIG. 15, stainless-steel powder containing no binder (for example, stearate emulsion, polyvinyl alcohol, or the like). In general, when stainless-steel powder is compressed using a molding die without mixing a binder, the shaped body may be frequently broken when being removed from the molding die due to low strength of the shaped body. In contrast to this, when the stainless-steel powder is shaped in the concave 62b1 with the side wall 62b2 in the elastic body 62b corresponding to a molding die, there is no need to remove the shaped body 62a2 from the molding die and thus the shaped body 62a2 does not become broken. In addition, the role of a binder in manufacture of a sintered body is mainly to maintain the shape of a shaped body until the start of sintering process. However, when the shaped body contains a binder, the shaped body needs to undergo a de-binding process before a sintering process. In the de-binding process, the shaped body is generally held in the atmosphere at a temperature of around 400° C. for a predetermined period of time. At that time, the strength of the shaped body becomes lower after the de-binding, and the shaped body may not be able to maintain the shape but may be cracked during the sintering process. In addition, the surfaces of the particles of the stainless-steel powder may become oxidized in the de-binding process to hinder metal diffusion bonding of the particles by sintering reaction, whereby the particles are not sufficiently bonded to each other to fail to obtain the desired strength. In particular, when a sintered body with a high porosity is manufactured, the shrinkage ratio during sintering becomes higher to make this failure more prone to occur.

In addition, carbon with low friction coefficient or the like is used for a plate on which the shaped body is placed during sintering to make the shaped body contract as freely as possible during sintering without restricting partially the contraction. However, the contraction of the shaped body during sintering may be hindered by gravitation to make the sintered body deformed or broken. To handle this, forming the shaped body 62a2 in the concave 62b1 provided in the elastic body 62b makes it possible to decrease significantly the possibility of deformation and breakage of the obtained sintered body. This is because the presence of the side wall 62b2 makes the shaped body 62a2 stronger against external force, which allows the shaped body 62a2 to maintain the shape in the concave 62b1 without having to use a binder. That is, providing the concave 62b1 with the side wall 62b2 allows the shaped body 62a2 to maintain the shape without collapse.

Figure 17:
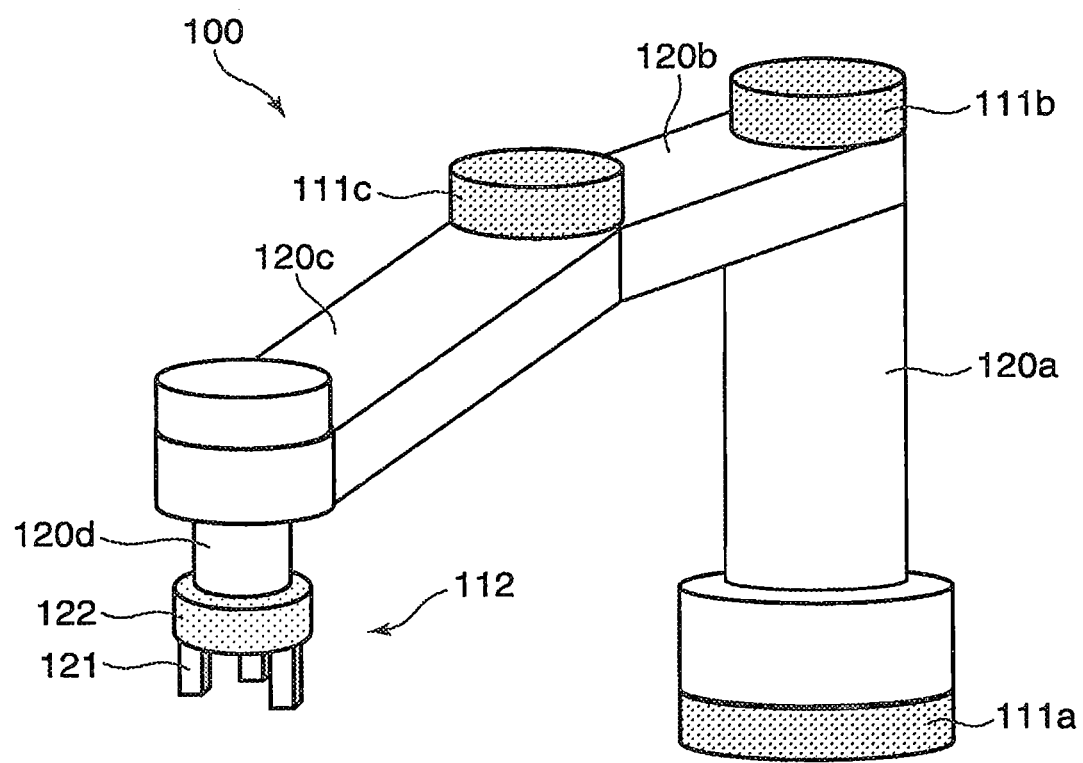
FIG. 17 is a schematic perspective view of configuration of a robot equipped with a vibration-type actuator.

Next, application examples of the vibration-type actuators 10, 20, and 30 will be explained. FIG. 17 is a schematic perspective view of configuration of a robot 100 equipped with a vibration-type actuator, which is a horizontal articulated robot as a kind of industrial robot. Rotational drive motors used for bending of arm joints and grasping and rotating operations of a hand of an industrial robot or the like need to have a specific TN characteristic (drooping characteristic showing a relationship between load torque and rotation speed) with which high torque can be obtained at a low rotation speed. Accordingly, the rotationally driven vibration-type actuator 20 (or vibration-type actuator 30) is built in arm joints 111a to 111c and a hand 112 of the robot 100, for example.

The arm joint 111a attached to a base stage not shown rotates an arm 120a around its thrust axis. The arm joint 111b connects arms 120a and 120b in such a manner that the crossing angle of the arms 120a and 120b can be changed, and the arm joint 111c connects arms 120b and 120c in such a manner that the crossing angle of the arms 120b and 120c can be changed. The hand 112 has an arm 120d, a grasping portion 121 attached to one end of the arm 120d, and a hand joint 122 connecting the arm 120d and the grasping portion 121. The hand joint 122 rotates the grasping portion 121. The vibration-type actuator 20 (or vibration-type actuator 30) is used as a rotational driving apparatus for the arm joints 111a to 111c and the hand joint 122.

Figure 18:
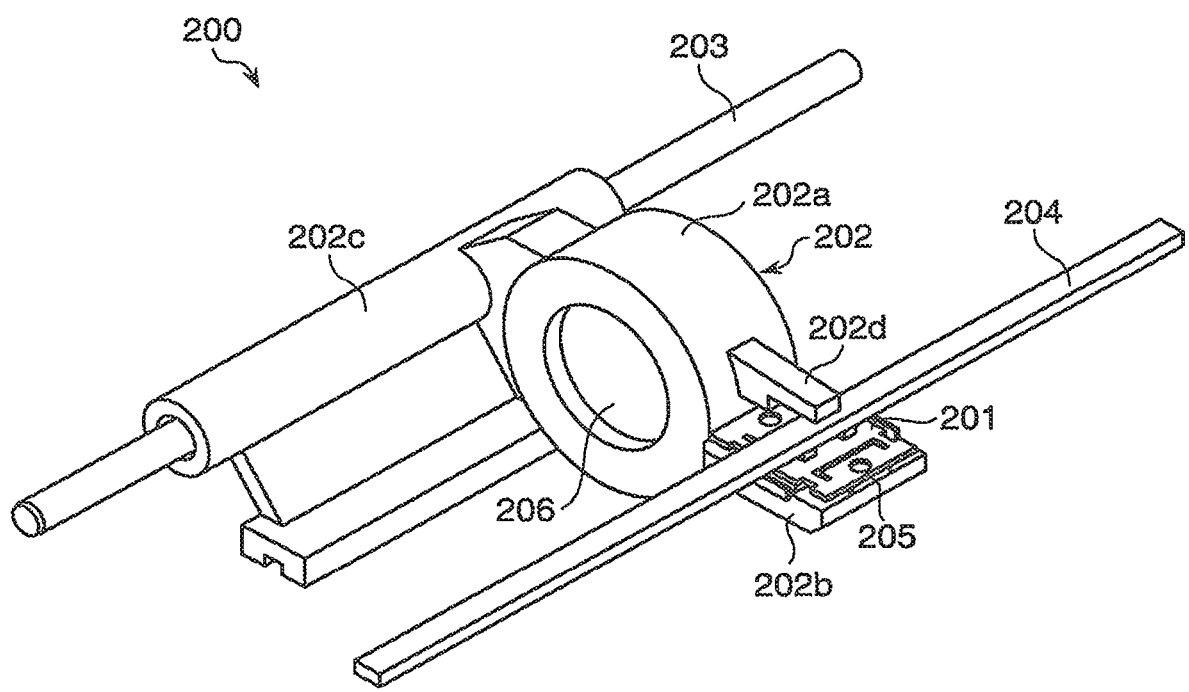
FIG. 18 is a schematic perspective view of configuration of a lens driving mechanism included in a lens barrel.

Next, an image pickup apparatus (optical device) including the linear-driven vibration-type actuator 10 will be explained. FIG. 18 is a schematic perspective view of configuration of a lens driving mechanism 200 included in a lens barrel. The lens driving mechanism 200 includes a vibrating body 201, a lens holder 202, a first guide bar 203, a second guide bar 204, a pressurizing magnet 205, and a lens 206. The vibrating body 201 and the second guide bar 204 respectively correspond to the vibrating body 2 and the driven body 1 constituting the vibration-type actuator 10 described above with reference to FIG. 1.

The first guide bar 203 and the second guide bar 204 are held on a base body not shown in such a manner as to be parallel to each other. The lens holder 202 has a cylindrical holder portion 202a holding the lens 206, a holding portion 202b holding the vibrating body 201 and the pressurizing magnet 205, and a guide portion 202c into which the first guide bar 203 is inserted. Inserting movably the first guide bar 203 into the guide portion 202c forms a first guide portion.

The pressurizing magnet 205 includes a permanent magnet and two yokes arranged on both ends of the permanent magnet. A magnetic circuit is formed between the pressurizing magnet 205 and the second guide bar 204, and the force of attraction is generated between these members to press the vibrating body 201 disposed between the pressurizing magnet 205 and the second guide bar 204 against the second guide bar 204. Accordingly, two projections included in the vibrating body 201 (equivalent to the projections 2a of the vibrating body 2) are brought into pressure contact with the second guide bar 204 to form a second guide portion. It should be noted that the second guide portion constitutes a guide mechanism using the magnetic attraction force, and the pressurizing magnet 205 is not in contact with the second guide bar 204. Accordingly, it is assumed that, when the second guide portion receives another external force or the like, the vibrating body 201 and the second guide bar 204 are separated from each other. As a countermeasure against this, the lens driving mechanism 200 is configured such that a separation preventing portion 202*d* provided on the lens holder 202 abuts with the second guide bar 204 to return the lens holder 202 (vibrating body 201) to a predetermined position.

The method for driving the vibrating body 201 is the same as the method for driving the vibrating body 2. Causing elliptic vibration to the two projections in the vibrating body 201 generates frictional driving force between the vibrating body 201 and the second guide bar 204. At that time, the first guide bar 203 and the second guide bar 204 are fixed, and thus the generated frictional driving force allows the lens holder 202 to move along the length direction of the first guide bar 203 and the second guide bar 204. It should be noted that magnetic force is used in the pressurizing mechanism of the lens driving mechanism 200, but biasing force from a spring may be used instead in the pressurizing mechanism. In addition, the lens driving mechanism 200 uses the linear-driven vibration-type actuator 10, but instead of this, the lens driving mechanism 200 may use the rotationally driven vibration-type actuator 20 or 30 shown in FIG. 3A or 7. Specifically, the rotational output of the vibration-type actuator 20 or 30 is converted into driving force for moving linearly the member holding the lens in the direction of the optical axis, by engagement between a cam pin and a cam groove, gears, or the like. The lens driving by the vibration-type actuator is suitable to driving of an auto-focus lens, but may be used for driving of a zoom lens as well. Further, the vibration-type actuator can also be used for driving a lens or an image pickup device at the time of camera-shake correction.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. In addition, an electronic device to which the vibration-type actuator according to the invention is applied is not limited to a robot and a lens barrel (image pickup apparatus) described above with reference to FIGS. 17 and 18 but the vibration-type actuator according to the invention is also applicable to a wide variety of electronic devices including components needed to be positioned by driving of the vibration-type actuator.

What is claimed is:

1. A friction member comprising:
   a friction portion including a stainless-steel sintered body with pores,
   wherein at least some of the pores are impregnated with a resin, which contains ceramic powder.

2. The friction member according to claim 1, wherein the resin is an epoxy resin or an acrylic resin.

3. The friction member according to claim 1, wherein the friction portion is made from the stainless-steel sintered body.

4. The friction member according to claim 1, further comprising a base member,
   wherein the stain-less steel sintered body of the friction portion is directly bonded to the base member.

5. The friction member according to claim 1, wherein the resin is dispersed in patches in the stainless steel sintered body.

6. The friction member according to claim 1, wherein ceramic particles are dispersed in the resin.

7. The friction member according to claim 1, wherein the ceramic powder is green carborundum ceramic powder or white alundum ceramic powder.

* * * * *